(12) United States Patent
Bhattacharya et al.

(10) Patent No.: US 10,848,500 B2
(45) Date of Patent: *Nov. 24, 2020

(54) SYSTEMS AND METHODS FOR GROUP-BASED MOBILE DEVICE MANAGEMENT

(71) Applicant: JAMF Software, LLC, Minneapolis, MN (US)

(72) Inventors: Aryik Bhattacharya, Maple Grove, MN (US); John Dassow, Minneapolis, MN (US); Michael Devins, Minneapolis, MN (US); Aaron Maxim, Seattle, WA (US); Jamison Schmidt, Eau Claire, WI (US)

(73) Assignee: JAMF Software, LLC, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/573,104

(22) Filed: Sep. 17, 2019

(65) Prior Publication Data

US 2020/0137070 A1    Apr. 30, 2020

Related U.S. Application Data

(60) Provisional application No. 62/750,108, filed on Oct. 24, 2018.

(51) Int. Cl.
*H04L 29/06* (2006.01)
*H04W 4/08* (2009.01)
(Continued)

(52) U.S. Cl.
CPC ............ *H04L 63/104* (2013.01); *H04L 67/26* (2013.01); *H04M 1/72583* (2013.01); *H04W 4/08* (2013.01); *G06Q 30/0601* (2013.01)

(58) Field of Classification Search
CPC ...... H04L 67/104; H04W 84/08; H04W 8/20; G06Q 30/02; G06Q 30/0601
(Continued)

(56) References Cited

U.S. PATENT DOCUMENTS 7,653,394 B2 *   1/2010   McMillin ................ H04L 45/00
                                                                455/444
9,647,897 B2     5/2017   Halmstad et al.
(Continued)

OTHER PUBLICATIONS

"Mobile Device Management (MDM) Protocol," retrieved from <<https://developer.apple.com/library/content/documentation/Miscellaneous/Reference...>>, retrieved on May 10, 2017, Apple, Inc., Cupertino, California, pp. 1-97.

*Primary Examiner* — Bryan F Wright

(57) ABSTRACT

A method includes sending, from a mobile device management (MDM) server, a group list to a mobile device, the group list indicating a plurality of MDM groups that are available to the mobile device for enrollment. The method also includes receiving, at the MDM server, a join group request from the mobile device. The join group request indicates a group of the plurality of MDM groups. The method also includes, in response to receiving the join group request, updating, at the MDM server, group membership data to indicate that the mobile device is added to the group. The method further includes identifying, based on the group membership data at the MDM server, an action associated with the group. The method also includes sending a command from the MDM server to the mobile device to perform the action.

18 Claims, 12 Drawing Sheets

(51) Int. Cl.
  *H04L 29/08* (2006.01)
  *H04M 1/725* (2006.01)
  *G06Q 30/06* (2012.01)
(58) Field of Classification Search
  USPC .......................................................... 726/4
  See application file for complete search history.

(56) References Cited

U.S. PATENT DOCUMENTS

| | | | |
|---|---|---|---|
| 9,693,190 B2* | 6/2017 | Moldaysky | G06Q 30/0261 |
| 9,998,914 B2 | 6/2018 | Halmstad et al. | |
| 2005/0091219 A1* | 4/2005 | Karachale | G06F 9/542 |
| 2006/0155981 A1* | 7/2006 | Mizutani | H04L 9/0822 |
| | | | 713/150 |
| 2007/0054687 A1* | 3/2007 | Akita | H04W 84/08 |
| | | | 455/518 |
| 2007/0186007 A1* | 8/2007 | Field | G06Q 30/02 |
| | | | 709/233 |
| 2010/0223096 A1* | 9/2010 | Bosan | G06Q 30/0601 |
| | | | 705/14.64 |
| 2011/0009107 A1* | 1/2011 | Guba | G08G 1/20 |
| | | | 455/418 |
| 2012/0202428 A1* | 8/2012 | Mirbaha | G06Q 50/01 |
| | | | 455/41.2 |
| 2013/0247166 A1 | 9/2013 | Freedman et al. | |
| 2014/0335823 A1* | 11/2014 | Heredia | H04W 4/50 |
| | | | 455/411 |
| 2015/0304484 A1* | 10/2015 | Halmstad | H04W 8/02 |
| | | | 455/419 |
| 2015/0339597 A1* | 11/2015 | Chiu | H04W 4/029 |
| | | | 705/5 |
| 2017/0273044 A1* | 9/2017 | Alsina | H04L 67/104 |
| 2018/0330115 A1 | 11/2018 | Felton | |
| 2019/0141655 A1* | 5/2019 | Stricklen | H04W 8/20 |

* cited by examiner

SYSTEMS AND METHODS FOR GROUP-BASED MOBILE DEVICE MANAGEMENT

I. CROSS-REFERENCE TO RELATED APPLICATIONS

The present application claims priority to U.S. Provisional Patent Application No. 62/750,108 filed on Oct. 24, 2018, the entire content of which is hereby incorporated by reference in its entirety. The present application hereby incorporates by reference the entire content of U.S. patent application Ser. No. 14/464,572, filed on Aug. 20, 2014, now U.S. Pat. No. 9,647,897, U.S. patent application Ser. No. 14/680,401, filed on Apr. 7, 2015, now U.S. Pat. No. 9,998,914, and U.S. patent application Ser. No. 15/594,226, filed on May 12, 2017.

II. FIELD

The present disclosure is generally related to group-based mobile device management.

III. BACKGROUND

Mobile devices are becoming increasingly prevalent in everyday use, including in home, office, and educational environments. For example, school districts are starting to implement one-to-one technology programs that provide each student access to a mobile device, such as a tablet computer. As another example, many corporations provide employees with mobile devices to perform job-related functions on-the-go. To maintain control of the devices, a school or corporation may rely on information technology (IT) administrators that maintain (i) a roster of devices, (ii) set up devices per user, and (iii) track a status of each device. However, relying on IT administrators for all mobile device management (MDM) is inefficient and expensive. For example, at a large corporation with thousands of employees it may take weeks for IT administrators to set up devices for particular employees, to provide the devices to the employees for use, and to reset devices after user by the employees.

IV. SUMMARY

Systems and methods of group-based mobile device management are disclosed. A mobile device management (MDM) server maintains group membership information based on "smart" groups. As used herein, a "smart" group may be a group whose membership is dynamically updated in response to certain events. To illustrate, an IT administrator may create a group that is directed to a particular set of users (e.g., a particular age group, a particular employment role, etc.). The membership of the group may be dynamically updated as managed devices (e.g., mobile phones, tablet computers, laptop computers, televisions, smart devices, entertainment devices, appliances, vehicles, navigation devices, etc.) send join group requests or reset requests to the MDM server. As used herein, a "MDM group" refers to a smart group.

As an illustrative non-limiting example, a group may be created for nurses. A set of mobile devices may be made available for users in a healthcare facility. A user may pick up any of the set of mobile devices and select a group option (e.g., a nursing option) corresponding to the group created for nurses. In this example, the user does not have to provide user information, such as a user identifier or a password. The mobile device sends a join group request to the MDM server. The MDM server adds the mobile device to the dynamically updated group for nurses in response to receiving the join group request. The MDM server sends a command to the mobile device to perform an action associated with the group. For example, the action can include downloading particular applications to the mobile device, downloading particular configuration settings to the mobile device, showing application icons of a first set of applications at a display of the mobile device, hiding application icons of a second set of applications at the display of the mobile device, or a combination thereof. The mobile device is thus automatically set up to have applications, configurations settings, etc. that are associated with the selected group (e.g., nurses). Similarly, there may be groups for doctors, lab technicians, etc. Thus users may regardless of group affiliation, initiate set-up of the mobile device independently of an IT administrator without requiring per-user carts, logins, or tracking.

The user may prefer to remove any personally identifiable data from the mobile device prior to returning the mobile device for use by other users. The user may select a reset option displayed by the mobile device. The mobile device sends a reset request to the MDM server. The MDM server sends a reset command to the mobile device. In a particular example, the MDM server queues the reset command for the mobile device and sends a notification request to a push notification service. The push notification service, in response to receiving the notification request indicating the mobile device, sends a push notification to the mobile device. The mobile device, in response to receiving the push notification, initiates a check-in event by sending a check-in message to the MDM server. The MDM server, in response to receiving the check-in message, sends the reset command to the mobile device. In some examples, the MDM server, in response to receiving the reset request, receiving the check-in message, or sending the reset command, updates the group membership information to remove the mobile device from the group. In other examples, the MDM server does not update the group membership information responsive to receiving the reset request, receiving the check-in message, or sending the reset command. The mobile device may perform a factory reset to remove applications, data, or both, that were installed responsive to the earlier join group request, that are associated with the user, or both. In some examples, the mobile device performs a full device wipe (e.g., deletes all data and applications) in response to receiving the reset command. The mobile device is thus automatically reset to remove applications, configurations settings, user data, etc. that is associated with a previously selected group (e.g., nursing), the user, or both. Notably, the user can initiate a MDM reset of the mobile device independently of an IT administrator.

It should be noted that although various aspects may be described herein with reference to educational or healthcare settings, these are for example only and not to be considered limiting. The teachings of the present disclosure may be applied to other mobile device environments, including but not limited to home environments, retail environments, corporate environments, etc.

In a particular aspect, a method includes sending, from a mobile device management (MDM) server, a group list to a mobile device. The group list indicates a plurality of MDM groups that are available to the mobile device for enrollment. The method also includes receiving, at the MDM server, a join group request from the mobile device. The join group request indicates a group of the plurality of MDM groups. The method further includes, in response to receiving the join group request, updating, at the MDM server, group membership data to indicate that the mobile device is added to the group. The method also includes identifying, based on the group membership data at the MDM server, an action associated with the group. The method further includes sending a command from the MDM server to the mobile device to perform the action.

In another particular aspect, a computer-readable storage device stores instructions that, when executed by a processor, cause the processor to perform operations including receiving, at a mobile device management (MDM) server, a reset request from a mobile device. The operations also include, in response to receiving the reset request, sending a notification request to a push notification service to initiate sending of a push notification from the push notification service to the mobile device. The operations further include receiving a check-in message from the mobile device responsive to the push notification. The operations also include, in response to receiving the check-in message, sending a remote reset command from the MDM server to the mobile device to initiate a reset of the mobile device. The remote reset command indicates that user notifications are to be suppressed during the reset of the mobile device.

In another particular aspect, a computer system includes a mobile device and a mobile device management (MDM) server. The mobile device is configured to receive a group list from a mobile device management (MDM) server. The group list indicates a plurality of MDM groups that are available to the mobile device for enrollment. The mobile device is also configured to receive a first user input indicating a selection of a group of the plurality of MDM groups. The mobile device is further configured to send a join group request to the MDM server indicating the group. The MDM server is configured to, in response to receiving the join group request from the mobile device, update group membership data to indicate that the mobile device is added to the group. The MDM server is also configured to identify, based on the group membership data, an action associated with the group. The MDM server is further configured to send a command to the mobile device to perform the action.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
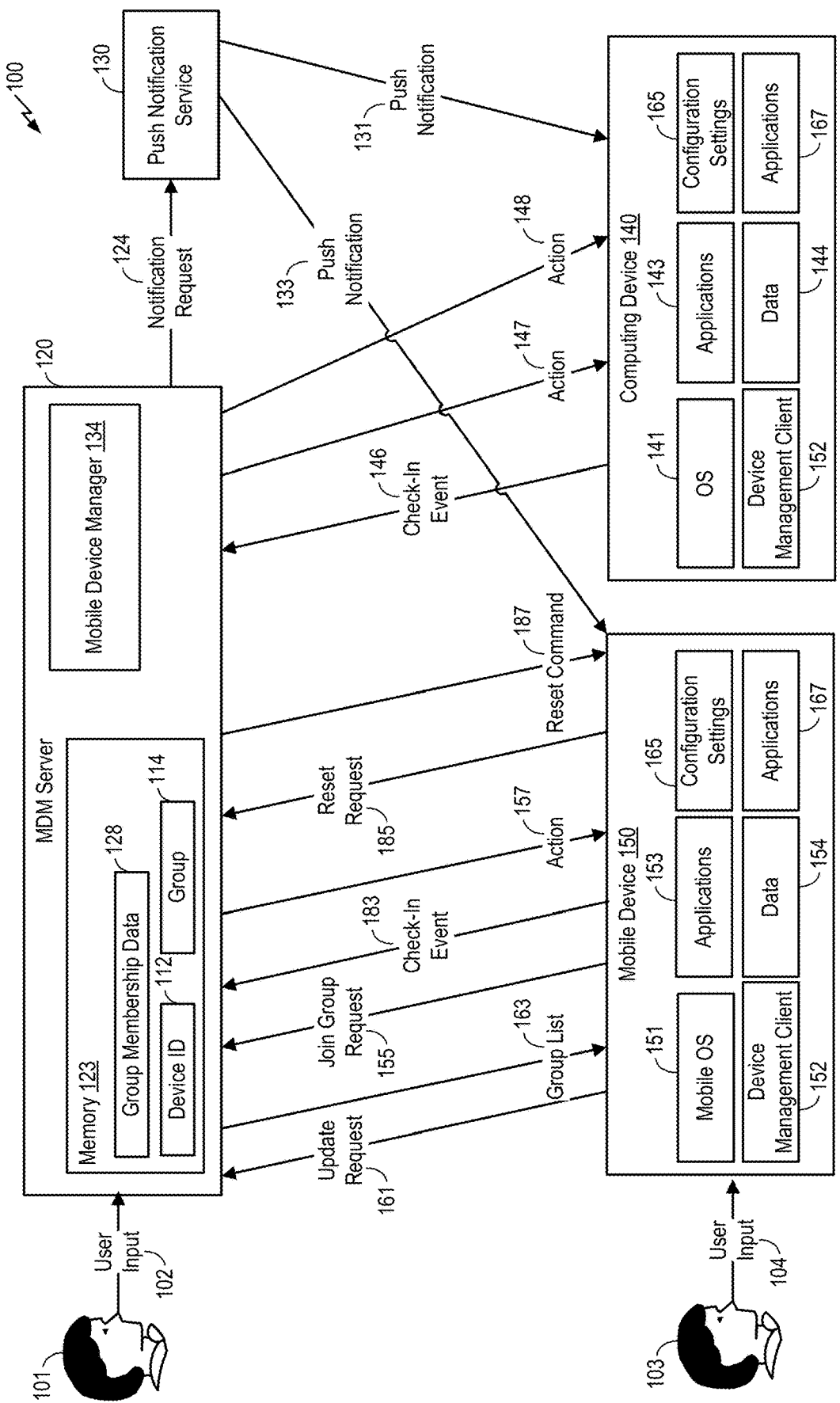
FIG. 1 is a block diagram of a particular illustrative aspect of a system operable to perform group-based mobile device management.

Referring to FIG. 1, a system is shown and generally designated 100. The system 100 (e.g., a computer system) includes a MDM server 120. The MDM server 120 is coupled to a push notification service 130, to a mobile device 150, and to a computing device 140. It should be understood that the MDM server 120 coupled to two devices is provided as an illustrative example. In some aspects, the MDM server 120 is coupled to fewer than two devices or more than two devices.

The computing device 140 may include an operating system (OS) 141 and the mobile device 150 may include a mobile OS 151. Each OS 141, 151 may control computing functions, such as input/output (e.g., a touchscreen display, speaker, microphone, camera, etc.) and networking (e.g., cellular, Bluetooth, wireless fidelity (Wi-Fi), Ethernet, etc.). Each OS 141, 151 may also support execution of applications (apps) 143, 153, 167 and provide such applications access to device resources and data 144, 154. Examples of applications include, but are not limited to, a web browser, e-mail, a calendar, social networking, a document/eBook reader, a media player, a gaming application, a patient management application, a medical reference application, a medication tracking tool, etc. Applications may correspond to software instructions that are stored in a memory and executed by a processor, hardware circuits that implement application functionality, or both.

The mobile device 150 includes a device management client 152. The device management client 152 of the mobile device 150 is configured to generate a graphical user interface (GUI) and provide the GUI to a display of the mobile device 150, as further described with reference to FIGS. 2-10. The device management client 152 of the mobile device 150 is configured to, in response to receiving a user input 104 indicating a selection of a group option corresponding to a group 114, send a join group request 155 to the MDM server 120. The device management client 152 of the mobile device 150 is configured to receive a command to perform an action 157 from the MDM server 120 and to initiate performance of the action 157. The action 157 includes, for example, downloading the one or more applications 167 associated with the group 114, downloading one or more configuration settings 165, generating a GUI that includes icons of the applications 167, generating a GUI that excludes icons of the one or more applications 153 associated with a group distinct from the group 114, deleting (or uninstalling) the applications 153 associated with the group distinct from the group 114, or a combination thereof, as further described herein. In some implementations, sending the join group request 155 indicating the group 114 does not cause deletion, at the mobile device 150, of applications, data, or a combination thereof, associated with any groups different from the group 114. In other implementations, sending the join group request 155 indicating the group 114 initiates deletion, at the mobile device 150, of applications, data, or a combination thereof, associated with one or more groups different from the group 114. For example, the join group request 155 initiates deletion of applications and data associated with groups other than the group 114, whereas the reset request 185 initiates deletion of all applications, all data, the mobile OS 151, the device management client 152, or a combination thereof.

The computing device 140 includes a copy of the device management client 152. The device management client 152 of the computing device 140 is configured to, in response to receiving a push notification 131 from the push notification service 130, initiate performance of a check-in event 146 by sending a check-in request to the MDM server 120.

In a particular aspect, the device management client 152 corresponds to a processor configured to perform one or more operations described herein. In a particular aspect, the device management client 152 corresponds to instructions that, when executed by a processor, cause the processor to perform one or more operations described herein. In a particular aspect, the device management client 152 corresponds to a computer-readable storage device that stores instructions that are executable to perform one or more operations described herein.

The MDM server 120 includes a memory 123, a mobile device manager 134, or both. The memory 123 is configured to store group membership data 128. The group membership data 128 indicates actions to be performed for particular groups, devices included in a group, or a combination thereof. For example, the mobile device manager 134 is configured to, in response to receiving the join group request 155 from the mobile device 150 and determining that the join group request 155 indicates the group 114, update the group membership data 128 to add the mobile device 150 to the group 114. The mobile device manager 134 is configured to send a command to the mobile device 150 indicating that the action 157 is to be performed.

In a particular aspect, the mobile device manager 134 corresponds to a processor configured to perform one or more operations described herein. In a particular aspect, the mobile device manager 134 corresponds to instructions that, when executed by a processor, cause the processor to perform one or more operations described herein. In a particular aspect, the mobile device manager 134 corresponds to a computer-readable storage device that stores instructions that are executable to perform one or more operations described herein.

During operation, a user 101 (e.g., an IT administrator) sets up one or more groups at the MDM server. For example, the user 101 provides user input 102 to the MDM server 120 indicating the group 114, one or more additional groups, or a combination thereof. The user input 102 indicates names of the groups, actions corresponding to the groups, or a combination thereof. For example, the user input 102 indicates a group name (e.g., "Nursing") of the group 114. In an illustrative example, the group 114 is based on an employment role (e.g., nurse, lab technician, doctor, or manager). The user 101 can set up the group 114 based on any criteria. For example, the user 101 may set up the group 114 based on age, gender, employment role, location, skill, relationship, another criteria, or a combination thereof. The user input 102 indicates the action 157 to be performed upon a device joining the group 114. For example, the user input 102 indicates that members of the group 114 are authorized to access the applications 167, that members of the group 114 are not authorized to access (e.g., are restricted from accessing) the applications 153, or a combination thereof. In a particular aspect, the user input 102 indicates the configuration settings 165. The action 157 indicates downloading of the applications 167, downloading of the configuration settings 165, generating a GUI that includes icons of the applications 167, generating a GUI that excludes icons of applications 153 associated with a different group (e.g., "Doctors"), deleting (or uninstalling) the applications 153, or a combination thereof.

In a particular aspect, the user input 102 indicates an action 147 to be performed by other member devices of the group 114 when a new member is added to the group 114. For example, the action 147 includes updating application data to indicate that the group 114 includes the new member. To illustrate, the group 114 has access to a messaging application and updating the application data causes the messaging application to indicate that the new member device is available for messaging.

In a particular aspect, the user input 102 indicates an action 148 to be performed by other members of the group 114 when a member leaves the group 114. For example, the action 148 includes updating application data to indicate that the member is removed from the group 114. In a particular aspect, the user input 102 indicates one or more reset parameter values when a member is removed from the group 114. For example, a first value of a first reset parameter indicates that all user notifications are to be suppressed at the device leaving the group when a reset is performed, a first value of a second reset parameter indicates that an activation lock is to be bypassed at the device leaving the group when a reset is performed, or a combination thereof. The mobile device manager 134 updates the group membership data 128 to indicate the group name of the group 114, a group identifier of the group 114, the action 157, the action 147, the action 148, the one or more reset parameter values, or a combination thereof.

In a particular implementation, the user 101 (or another user, such as an application developer) can customize the device management client 152 to generate GUIs having a particular look and feel. For example, the user 101 can provide user input 102 specifying configuration input, such as a custom header logo (e.g., a company logo), custom background colors, custom text descriptions, or a combination thereof. To illustrate, a custom text description can guide users with contextual language (e.g., "Welcome to Acme Hospital. Please select the right role to begin your shift," "At the end of your stay, please tap reset to ensure your personal data is removed," etc.). In a particular example, a custom text description can support regional language (e.g., Spanish, English, French, Arabic, Chinese, etc.). In a particular aspect, the MDM server 120 provides client configuration data indicating the configuration input to the mobile device 150. The device management client 152 updates configuration settings based on the client configuration data.

A user 103 (e.g., a healthcare worker) selects a setup option displayed by the mobile device 150. For example, the device management client 152 of the mobile device 150 generates a GUI indicating the setup option, a reset option, or both. In a particular aspect, the GUI has a look and feel corresponding to the configuration settings based on the client configuration data. For example, the GUI includes the custom header logo, the custom background colors, the custom text descriptions, or a combination thereof. The device management client 152 of the mobile device 150 receives a group list 163 from the MDM server 120. The group list 163 indicates a plurality of MDM groups that are available to the mobile device 150 for enrollment.

The mobile device manager 134 generates the group list 163 based on the group membership data 128. The group list 163 indicates names and identifiers of groups indicated by the group membership data 128. For example, the group list 163 indicates the group name (e.g., "Nursing"), the group identifier, or both, of the group 114. In a particular aspect, all groups are available to the mobile device 150 for enrollment. In an alternative aspect, a subset of groups is available to the mobile device 150. For example, the user input 102 indicates that a set of groups is available for enrollment to devices that satisfy an enrollment criterion. The mobile device manager 134 generates the group list 163 corresponding to the mobile device 150. For example, the mobile device manager 134 adds the group 114 to the group list 163 in response to determining that the mobile device 150 satisfies an enrollment criterion corresponding to the group 114.

The group criterion is based on, for example, a device capability, a device component, a device status, a device battery level, a device memory space, a device operating system, a device software version, a device type, a device location, another group criterion, or a combination thereof. For example, the group membership data 128 indicates that the group criterion corresponding to the group 114 (e.g., "Patient Care Staff") is satisfied by a device that satisfies a second group criterion corresponding to a second group (e.g., "Nursing") or a third group criterion corresponding to a third group (e.g., "Doctors").

In a particular aspect, the device management client 152 receives the group list 163 from the MDM server 120 in response to sending an update request 161 to the MDM server 120. For example, the device management client 152 of the mobile device 150, in response to receiving the user input 104 indicating a selection of the setup option, sends the update request 161 to the MDM server 120 to determine available groups. The mobile device manager 134 sends the group list 163 to the mobile device 150 in response to receiving the update request 161 from the mobile device 150.

In a particular aspect, the mobile device manager 134 sends the group list 163 to the mobile device 150 independently of receiving the update request 161. For example, the mobile device 150 sends a registration request to the MDM server 120. The MDM server 120, in response to receiving the registration request, adds the mobile device 150 to one or more registered devices (e.g., managed devices) and sends the group list 163 to the mobile device 150. Subsequently, the mobile device manager 134, in response to updating the group membership data 128, sends updates of the group list 163 to the registered devices. For example, the mobile device manager 134 sends a notification request 124 to the push notification service 130. The push notification service 130 sends a push notification 133 to the mobile device 150 responsive to receiving the notification request 124. The mobile device 150 initiates a check-in event 183 by sending a check-in message to the MDM server 120 responsive to receiving the push notification. The MDM server 120 sends an updated version of the group list 163 to the mobile device 150 in response to receiving the check-in message from the mobile device 150.

The device management client 152 of the mobile device 150, in response to receiving the group list 163, generates a GUI indicating one or more group options. For example, the device management client 152 of the mobile device 150 generates a GUI indicating a first group option (e.g., "<option value=group identifier of the group 114>group name of the group 114</option>") associated with the group 114, a second group option associated with a second group, one or more additional group options, or a combination thereof, as further described with reference to FIG. 3. In a particular aspect, the GUI has a look and feel corresponding to the configuration settings based on the client configuration data. For example, the GUI includes the custom header logo, the custom background colors, the custom text descriptions, or a combination thereof. The device management client 152 of the mobile device 150 provides the GUI to a display of the mobile device 150.

The user 103 selects the first group option (e.g., "Nursing") associated with the group 114. The device management client 152 of the mobile device 150, in response to receiving the user input 104 indicating a selection of the first group option (e.g., "Nursing"), sends the join group request 155 to the MDM server 120. The join group request 155 indicates the group identifier of the group 114.

The mobile device manager 134, in response to receiving the join group request 155, updates the group membership data 128 to indicate that the mobile device 150 is added to the group 114. For example, the mobile device manager 134 updates the group membership data 128 to indicate that a device identifier (ID) 112 of the mobile device 150 is included in the group 114.

The mobile device manager 134, in response to determining that the group membership data 128 indicates that the action 157 is to be performed upon joining the group 114, sends a command to the mobile device 150 to initiate performance of the action 157 at the mobile device 150. For example, the mobile device manager 134 identifies, based on the group membership data 128, the applications 167 that the group 114 is authorized to access.

The device management client 152 of the mobile device 150, in response to receiving the command from the MDM server 120, initiates performance of the action 157. In a particular aspect, the action 157 includes downloading the applications 167. The device management client 152 of the mobile device 150 identifies one or more of the applications 167 that are unavailable (e.g., not previously downloaded) at the mobile device 150. The device management client 152 of the mobile device 150 automatically (e.g., without requiring authorization from the user 103) downloads the one or more of the applications 167 to the mobile device 150. In a particular aspect, the device management client 152 of the mobile device 150 downloads a first application from the MDM server 120, a second application from another device, an update of a third application from the MDM server 120, an update of a fourth application from another device, or a combination thereof. In a particular aspect, each of the applications 167 (e.g., updated versions of the applications 167) is available at the mobile device 150 and the device management client 152 of the mobile device 150 refrains from downloading any of the applications 167 (or application updates).

In a particular aspect, the action 157 includes downloading and implementing the configuration settings 165. The device management client 152 of the mobile device 150 downloads a first configuration setting of the configuration settings 165 from the MDM server 120, a second configuration setting of the configuration settings 165 from another device, or a combination thereof. In a particular aspect, the configuration settings 165 are used to configure display settings for the mobile device 150. For example, the configuration settings 165 indicate an arrangement of icons of the applications 153 in a GUI to be displayed by the mobile device 150, a size of the icons in the GUI, a background for the GUI, or a combination thereof. In a particular implementation, the background of the GUI indicates the group 114 (e.g., the group name).

In a particular aspect, the action 157 includes generating a GUI indicating icons of the applications 167, excluding icons of the applications 153, deleting (or uninstalling) the applications 153, or a combination thereof. The device management client 152 of the mobile device 150 generates a GUI indicating icons of the applications 167, excluding icons of the applications 153, or a combination thereof. The device management client 152 of the mobile device 150 deletes the applications 153, application data corresponding to the applications 153, or a combination thereof, from the mobile device 150. In a particular aspect, automatically removing the applications 153 upon the mobile device 150 joining the group 114 improves security by preventing unauthorized access to the applications 153. The device management client 152 of the mobile device 150, in response to determining that a particular application is included in the applications 167 and in the applications 153, generates the GUI to indicate an icon corresponding to the particular application, refrains from deleting the particular application, or both. The device management client 152 of the mobile device 150 provides the GUI to a display of the mobile device 150. The GUI of the mobile device 150 is thus automatically updated to display application icons based on group membership of the mobile device 150. For example, the GUI is updated to include icons associated with the applications 167 that the group 114 is authorized to access, to exclude icons associated with the applications 153 that the group 114 is restricted from accessing, or a combination thereof.

In a particular aspect, the mobile device manager 134, in response to determining that the group membership data 128 indicates that the action 147 is to be performed by other members of the group 114 and that the group 114 includes at least one other member, sends the notification request 124 to the push notification service 130 to initiate transmission of push notifications to the other members of the group 114. For example, the MDM server 120 sends the notification request 124 to the push notification service 130 to initiate transmission of the push notification 131 to the computing device 140. The push notification service 130 sends the push notification 131 to the computing device 140 in response to receiving the notification request 124 and determining that the notification request 124 indicates the computing device 140. The push notification 131 instructs the computing device 140 to check-in with the MDM server 120. For example, the push notification service 130 may be a trusted source for the computing device 140 and the push notification 131 may indicate that the MDM server 120 is a trusted device.

The device management client 152 of the computing device 140 initiates the check-in event 146 responsive to the push notification 131 by sending a check-in request to the MDM server 120. The MDM server 120 may, in response to receiving the check-in request, send a command to the computing device 140 to initiate performance of the action 147. For example, the action 147 includes updating the data 144 associated with a first application of the applications 167 to indicate that the mobile device 150 is added to the group 114. To illustrate, the first application includes a messaging application that enables messaging devices of the group 114. Updating the data 144 causes the messaging application to indicate at the computing device 140 that the mobile device 150 is available for messaging. In a particular aspect, the computing device 140, as a member of the group 114, has access to the applications 167 associated with the group 114, the configuration settings 165 associated with the group 114, or both. In a particular aspect, the computing device 140 has access to the one or more applications 143 associated with a different group than the group 114.

In a particular aspect, the MDM server 120 initiates an action to be performed at devices that are members of the group 114. For example, the mobile device manager 134 determines that the action is to be performed in response to determining that a performance criterion corresponding to the action is satisfied. The performance criterion is based on the user input 102, a detected condition, or both. In a particular aspect, the mobile device manager 134, in response to determining that the performance criterion is satisfied, sends the notification request 124 to the push notification service 130. The mobile device manager 134 identifies members devices of the group 114 (e.g., current members) based on the group membership data 128. In a particular aspect, the mobile device manager 134 identifies a set of enrollment devices for which the group 114 is available for enrollment. For example, the set of enrollment devices includes the member devices and may include one or more additional devices. The notification request 124 indicates the member devices of the group 114, the set of enrollment devices, or a combination thereof.

The push notification service 130 sends push notifications to the member devices of the group 114. The mobile device manager, in response to receiving a check-in message from a member device, sends a command to the member device to initiate performance of the action. For example, the mobile device manager, in response to receiving a check-in message from the mobile device 150, sends a command to the mobile device 150 to initiate performance of the action at the mobile device 150. The mobile device manager 134 can thus manage performance of actions based on group-affiliations of devices. For example, the mobile device manager 134 can manage performance of actions based on group-membership of devices, device ability to enroll in a group, or both. In a particular aspect, the mobile device manager 134 updates the group membership data 128 to indicate that the action to be performed upon a device joining the group 114. In this aspect, the mobile device manager 134 can manage performance of actions by future members of the group 114.

In a particular aspect, as the user 103 uses the mobile device 150, the mobile device 150 stores (or updates) the data 154. For example, the data 154 includes username and password information used by the user 103 to log into a first application of the applications 167. As another example, the data 154 includes e-mails, messages, or other files, that the user 103 downloaded to the mobile device 150. As a particular example, the data 154 includes personalization settings (e.g., display settings) that the user 103 has used to personalize the mobile device 150.

In a particular example, the user 103 sets an activation lock on the mobile device 150. To illustrate, the user 103 accesses an application of the applications 167 with a username and password. The application creates an activation lock for the mobile device 150 based on the username and password. For example, the application associates the mobile device with an account corresponding to the username. Subsequent to the creation of the activation lock, access to one or more of the applications 167 is based on the username and password. In other words, access to the one or more of the applications 167 is unauthorized without the username and password.

In a particular example, the user 103 uses a settings application on the mobile device 150 to provide a username and password associated with a user account. The settings application creates an activation lock that associates the mobile device 150 with the user account. The activation lock restricts the mobile device 150 from being setup without the username or password subsequent to a reset of the mobile device 150. For example, the activation lock can lock out the user 101 (e.g., anyone without the username and password) from setting up the mobile device 150 subsequent to a reset of the mobile device 150. In a particular aspect, the device management client 152 disables the functionality to set an activation lock at the mobile device 150 during an initial setup of the mobile device 150.

In a particular aspect, the user 103 is a member of multiple groups or changes membership from the group 114 to a second group. The user 103 provides the user input 104 indicating a selection of a second group option associated with a second group of the group list 163. The device management client 152 sends the join group request 155 to the MDM server 120 indicating the second group. The mobile device manager 134 updates the group membership data 128 to indicate that the device ID 112 of the mobile device 150 is associated with the second group, sends the notification request 124 to the push notification service 130 to initiate sending of push notifications to other members of the second group, or a combination thereof. In a particular implementation, the mobile device manager 134 updates the group membership data 128 to remove the mobile device 150 from the group 114, sends the notification request 124 to the push notification service 130 to initiate sending of push notifications to other members of the group 114, sends a reset command 187 to the mobile device 150, or a combination thereof. In an alternate implementation, the group membership data 128 indicates that the mobile device 150 is a member of the group 114 and a member of the second group.

In a particular aspect, the user 103 decides to remove personally identifiable information from the mobile device 150. For example, the user 103 is ready to reset the mobile device 150 prior to returning the mobile device 150 for use by other users. The user 103 selects a reset option from a GUI displayed by the mobile device 150. The device management client 152, in response to receiving the user input 104 indicating the selection of the reset option, sends a reset request 185 to the MDM server 120. The reset request 185 indicates the device ID 112 of the mobile device 150. In some implementations, the mobile device manager 134, in response to receiving the reset request 185 from the mobile device 150, updates the group membership data 128 to indicate that the mobile device 150 is not included in any groups. For example, the mobile device manager 134 updates the group membership data 128 to remove the mobile device 150 from the group 114. In other implementations, the mobile device manager 134 refrains from updating the group membership data 128 responsive to receiving the reset request 185.

In some examples, the mobile device manager 134, in response to determining that the group membership data 128 indicates that the action 148 is to be performed by other members of the group 114 upon removal of a member from the group 114 and that the group 114 includes one or more other members, sends the notification request 124 to the push notification service 130 indicating the one or more other members. For example, the mobile device manager 134 sends the notification request 124 indicating the computing device 140 to the push notification service 130. The push notification service 130, in response to receiving the notification request 124 and determining that the notification request 124 indicates the computing device 140, sends the push notification 131 to the computing device 140. The device management client 152 of the computing device 140, in response to receiving the push notification 131, initiates the check-in event 146 by sending a check-in request to the MDM server 120. The MDM server 120, in response to receiving the check-in request from the computing device 140, sends a command to the computing device 140 to initiate performance of the action 148. The device management client 152 of the computing device 140 performs the action 148 in response to receiving the command from the MDM server 120. For example, the device management client 152 of the computing device 140 updates the data 144 of a first application of the applications 167 to indicate that the mobile device 150 is removed from the group 114. To illustrate, the first application includes a messaging application and updating the data 144 causes the messaging application to remove an indication at the computing device 140 that the mobile device 150 is available for messaging.

The mobile device manager 134, in response to receiving the reset request 185 from the mobile device 150 indicating the device ID 112 of the mobile device 150, sends the reset command 187 (e.g., a remote reset command) to the mobile device 150. In some examples, the mobile device manager 134, in response to receiving the reset request 185, queues the reset command 187 for the mobile device 150 and sends the notification request 124 indicating the mobile device 150 to the push notification service 130. The push notification service 130, in response to receiving the notification request 124 indicating the mobile device 150, sends the push notification 133 to the mobile device 150. The mobile device 150, in response to receiving the push notification 133, initiates the check-in event 183 by sending a check-in message to the MDM server 120. The MDM server 120, in response to receiving the check-in message from the mobile device 150 and determining that the reset command 187 is queued for the mobile device 150, sends the reset command 187 to the mobile device 150.

In a particular aspect, the reset command 187 corresponds to a factory reset command. To improve user confidentiality, the device management client 152 of the mobile device 150 may, in response to receiving the reset command 187, delete the data 154, the applications 153, the applications 167, the configuration settings 165, or a combination thereof. In some examples, the device management client 152, in response to receiving the reset command 187, initiates deletion of the mobile OS 151, the device management client 152, or both.

In a particular aspect, the mobile device manager 134, in response to determining that the group membership data 128 indicates the one or more reset parameter values, generates the reset command 187 indicating the one or more reset parameter values. The device management client 152 performs the reset of the mobile device 150 based on the one or more reset parameter values. For example, the device management client 152 initiates a factory reset command that indicates the one or more reset parameter values.

In a particular aspect, the device management client 152 of the mobile device 150 is configured to, in response to determining that the reset command 187 indicates that a first reset parameter (e.g., a suppress notification parameter) has a first value (e.g., 1), suppress user notifications during reset of the mobile device 150. For example, the device management client 152, in response to determining that the first reset parameter has a first value indicating that user notifications are to be suppressed during reset of the mobile device 150, suppresses user notifications during deletion of the data 154, the applications 153, the applications 167, the configuration settings 165, or a combination thereof.

In a particular aspect, the device management client 152 of the mobile device 150 is configured to, in response to determining that the reset command 187 indicates that a second reset parameter (e.g., an activation bypass parameter) has a first value (e.g., 1), removes an activation lock during reset of the mobile device 150. For example, the device management client 152 removes the activation lock and deletes the data 154, the applications 153, the applications 167, the configuration settings 165, or a combination thereof. In a particular aspect, removal of the activation lock enables unrestricted setup of the mobile device 150 subsequent to the reset. For example, setup of the mobile device 150 can be performed subsequent to the reset independently of a username and password of the user 103.

The system 100 thus enables the mobile device 150 to be automatically set up to have the applications 167, the configurations settings 165, etc. that are associated with the selected group 114 (e.g., "Nursing"). The user 103 initiates the set-up of the mobile device 150 independently of an IT administrator. The system 100 also enables the mobile device 150 to automatically reset by removing applications, configurations settings, user data, etc. that is associated with a group (e.g., nursing), the user, or both. The user initiates the reset of the mobile device independently of an IT administrator. For example, the user can efficiently remove sensitive information from a shared device (e.g., the mobile device 150) without having to rely on an IT administrator to remove the information from the shared device. In a particular example, a reset option is displayed on a home screen of the mobile device 150 for easy access by the user. The user can select the reset option before handing over the mobile device 150 to another user. The mobile device 150 is available for re-use without delay associated with an IT administrator performing a reset of the mobile device 150.

In a particular example, a user can select the reset option for a "fresh start". To illustrate, the user could be experiencing issues with operation of the mobile device 150. The user can select the reset option as a troubleshooting step to resolve the issues without (or prior to) contacting an IT administrator.

The system 100 enables customization of the mobile device 150 for the group 114. Generally, a personal device is personalized for use by a single user based on login information, whereas a public device has the same settings for use by everyone. As a customized device, the mobile device 150 balances the advantages of a personal device and advantages of a public device by providing customization for groups of users without restricting the use of the mobile device 150 to a single user. A single device (e.g., the mobile device 150) can be customized to support use by multiple groups of users. Having devices that can support multiple groups of users can reduce costs as compared to having dedicated devices for particular groups. For example, a first group of users may use a higher number of devices at a first time and a second group of users may use a higher number of devices at a second time. Having devices that are not being used by one group of users available for use by another group of users provides support for the same overall number of users with fewer devices. The system 100 has the benefit of group-specific customization of the mobile device 150 as well as the benefit of group-specific customization management at the MDM server 120. For example, a user 101 can provide user input 102 to set up one or more groups at the MDM server 120, and each mobile device 150 that joins a particular group is automatically customized according to the particular group, independently of a user of each mobile device 150 having to perform customization of the mobile device 150.

Figure 2:
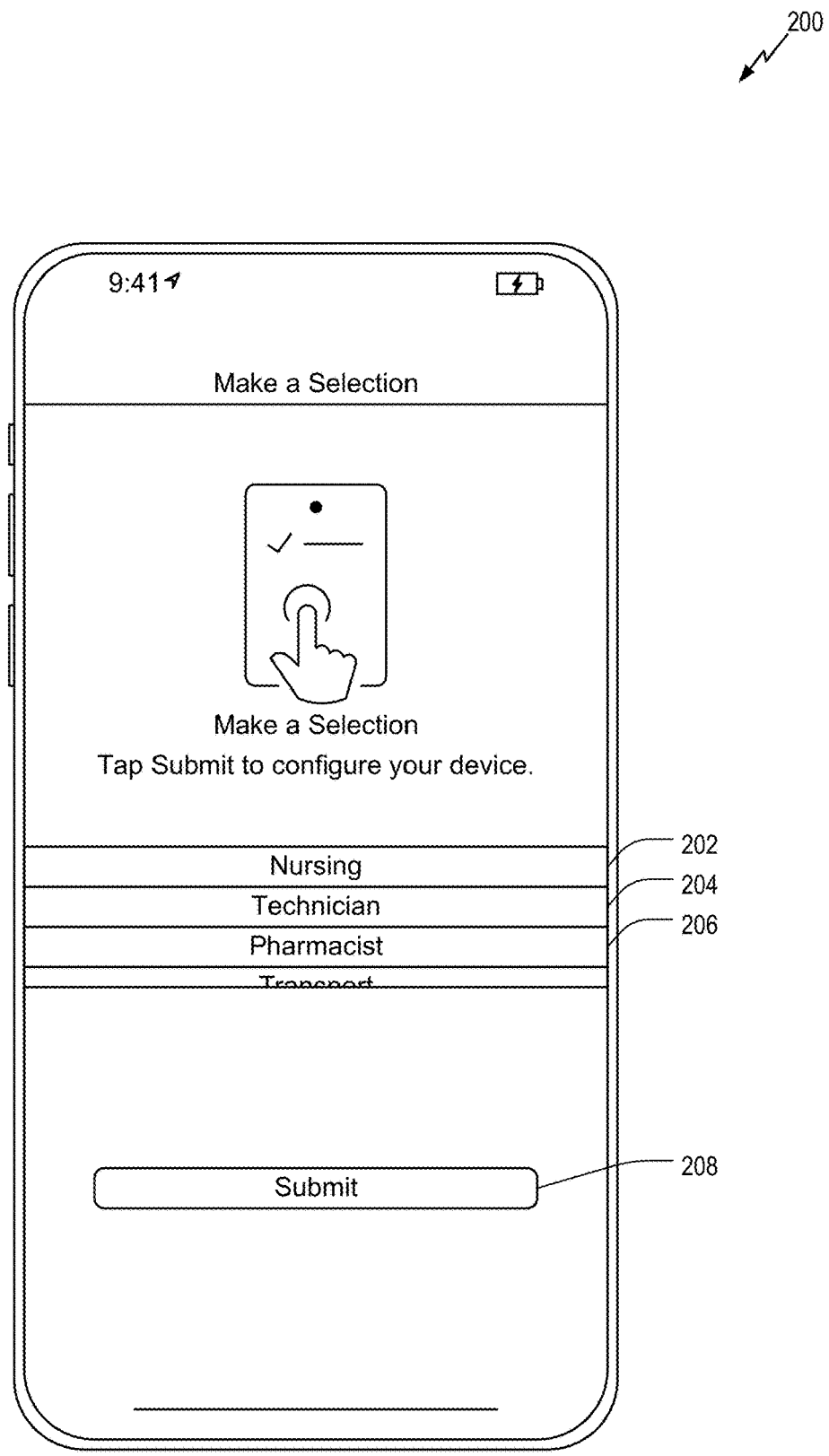
FIG. 2 is a diagram of a particular illustrative aspect of a graphical user interface (GUI) generated by the system of FIG. 1.
Figure 3:
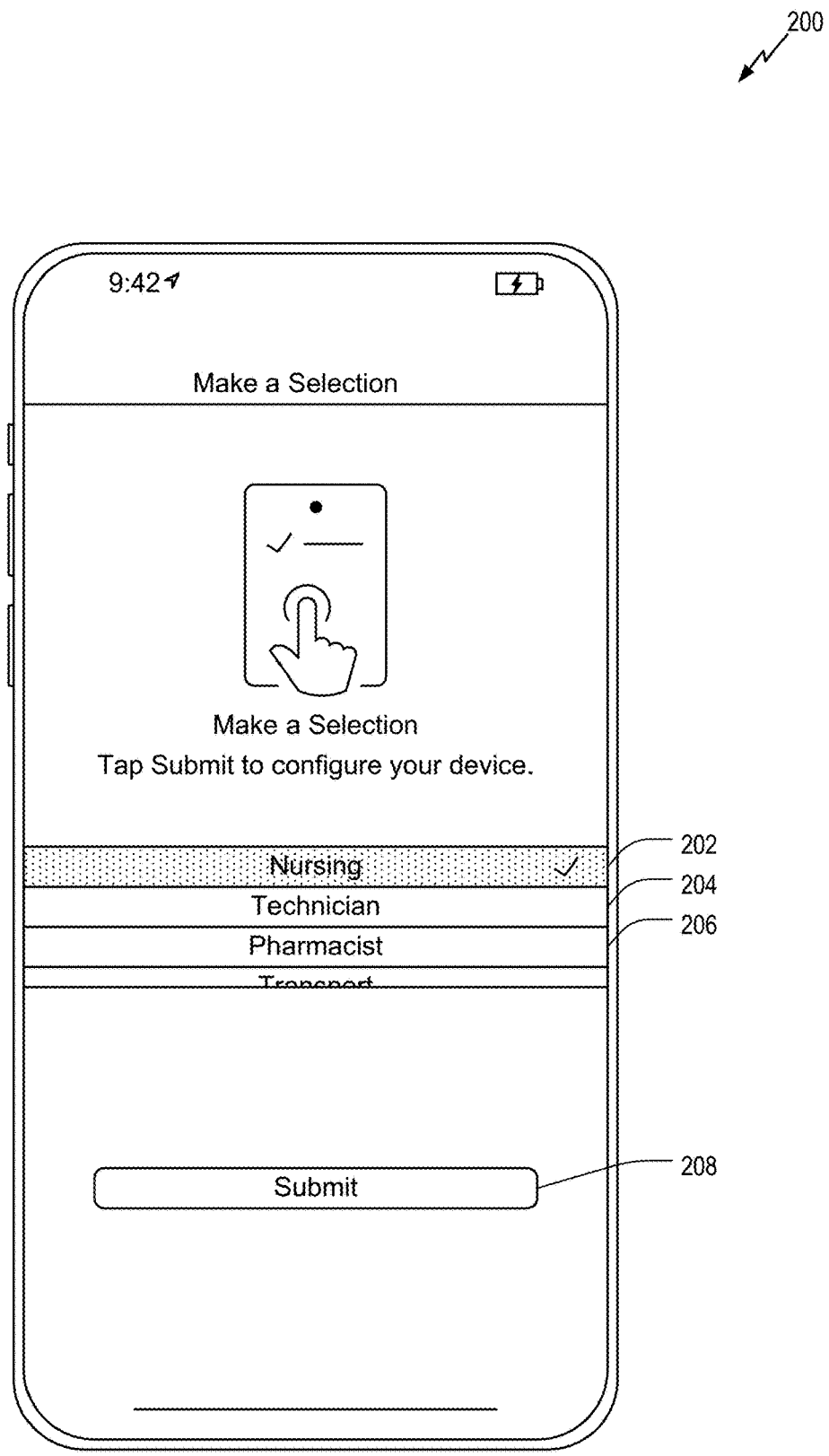
FIG. 3 is a diagram of a particular illustrative aspect of another GUI generated by the system of FIG. 1.
Figure 4:
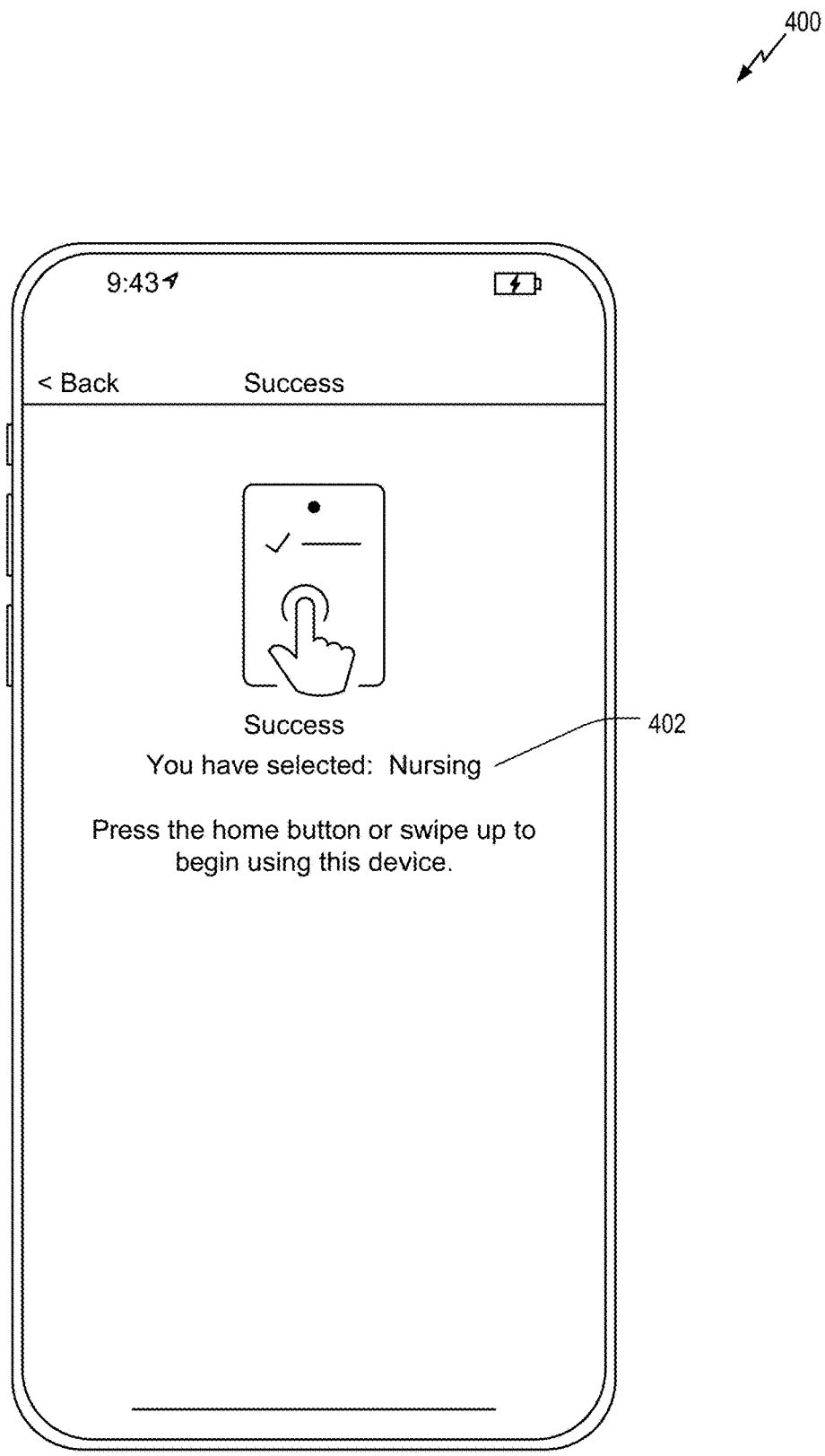
FIG. 4 is a diagram of a particular illustrative aspect of another GUI generated by the system of FIG. 1.
Figure 5:
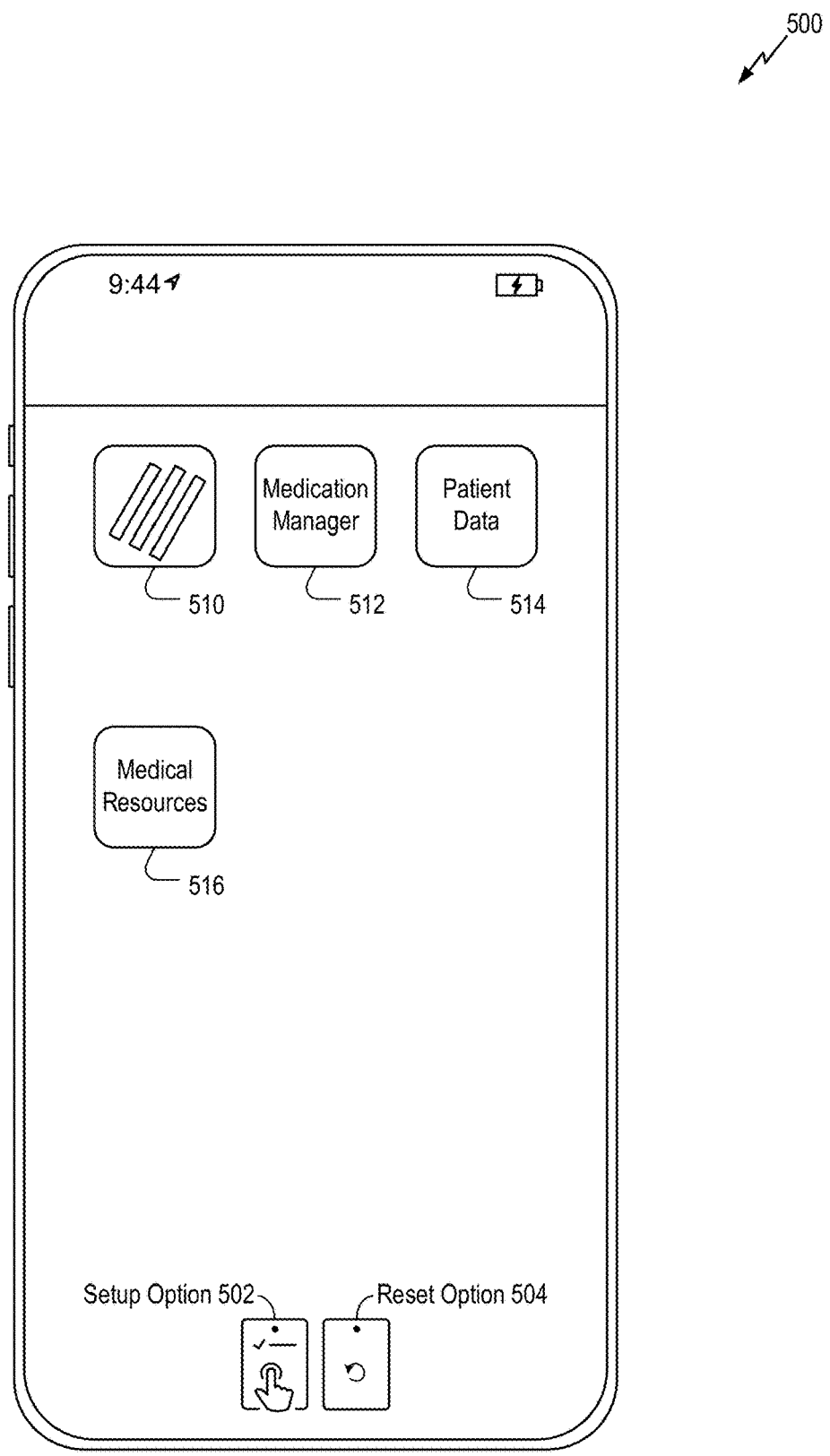
FIG. 5 is a diagram of a particular illustrative aspect of another GUI generated by the system of FIG. 1.
Figure 6:
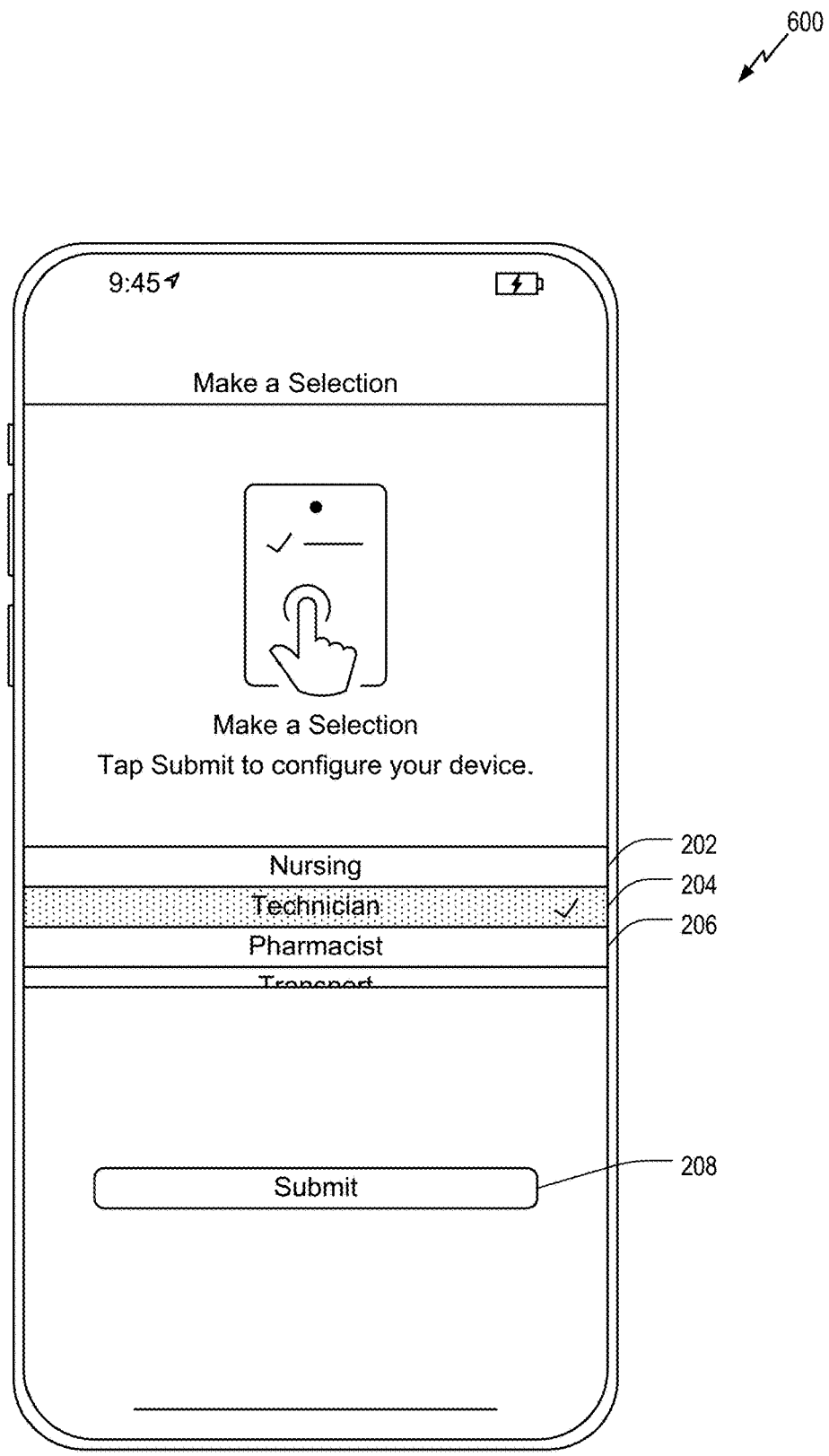
FIG. 6 is a diagram of a particular illustrative aspect of another GUI generated by the system of FIG. 1.
Figure 7:
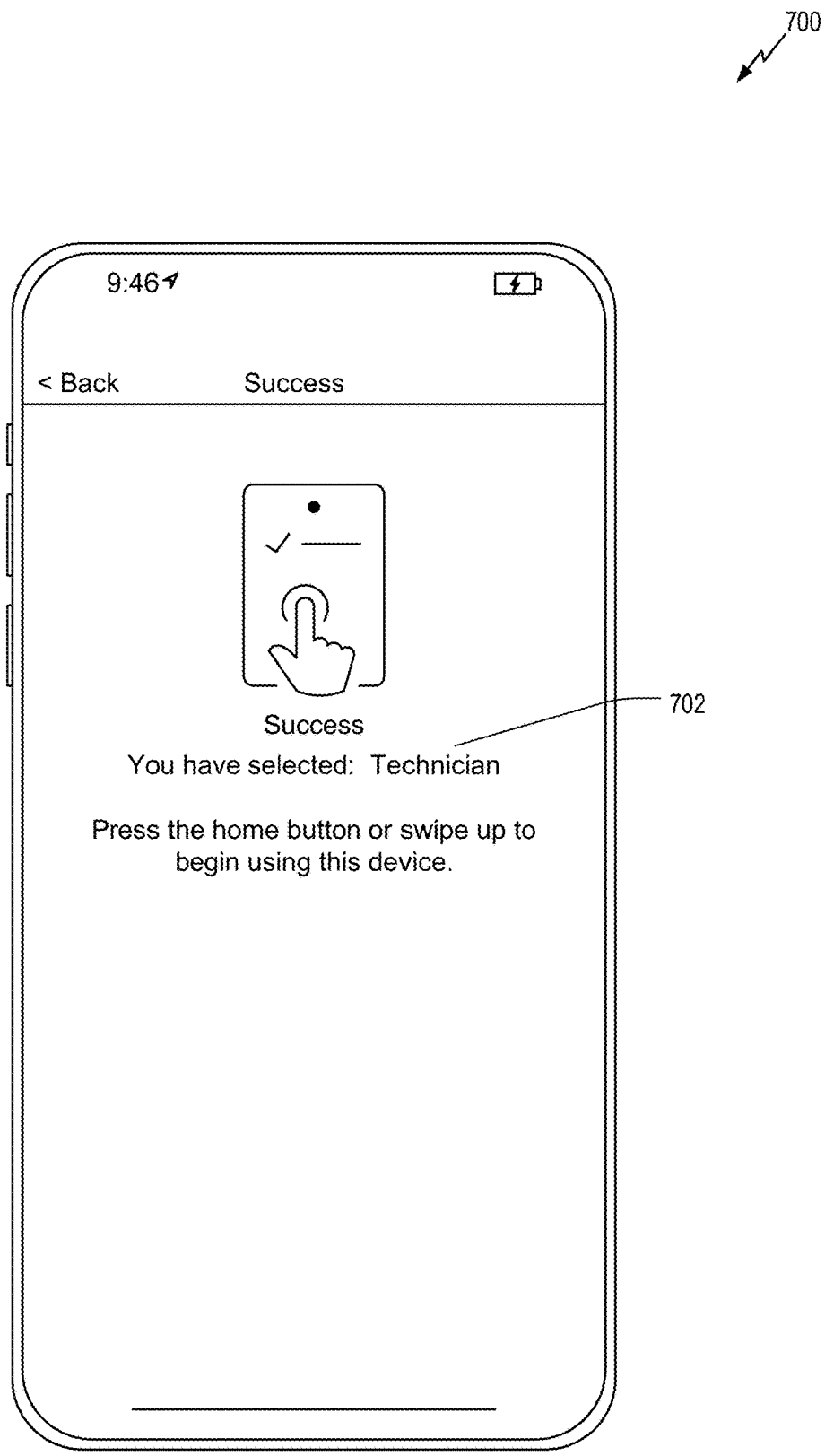
FIG. 7 is a diagram of a particular illustrative aspect of another GUI generated by the system of FIG. 1.
Figure 8:
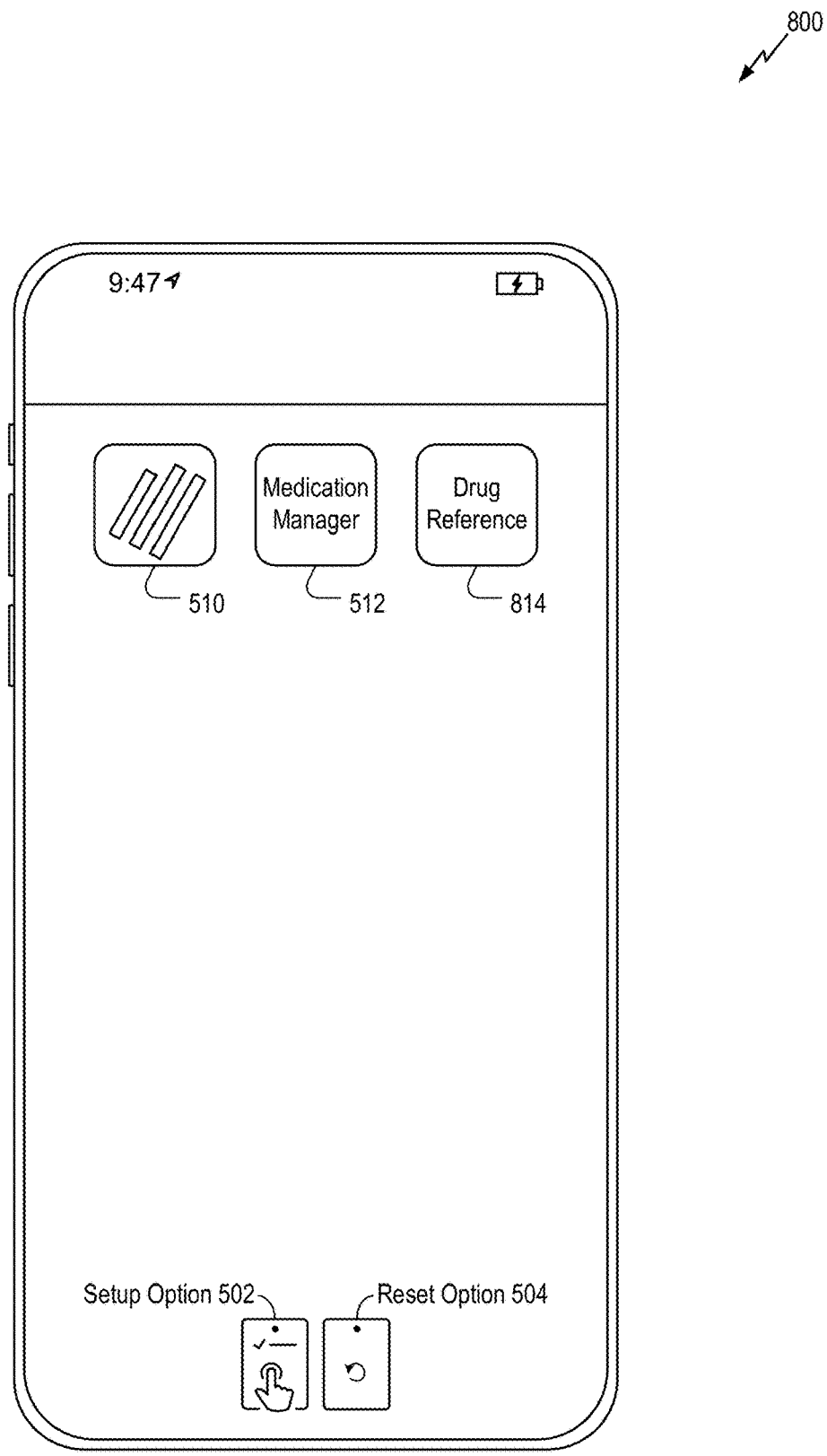
FIG. 8 is a diagram of a particular illustrative aspect of another GUI generated by the system of FIG. 1.
Figure 9:
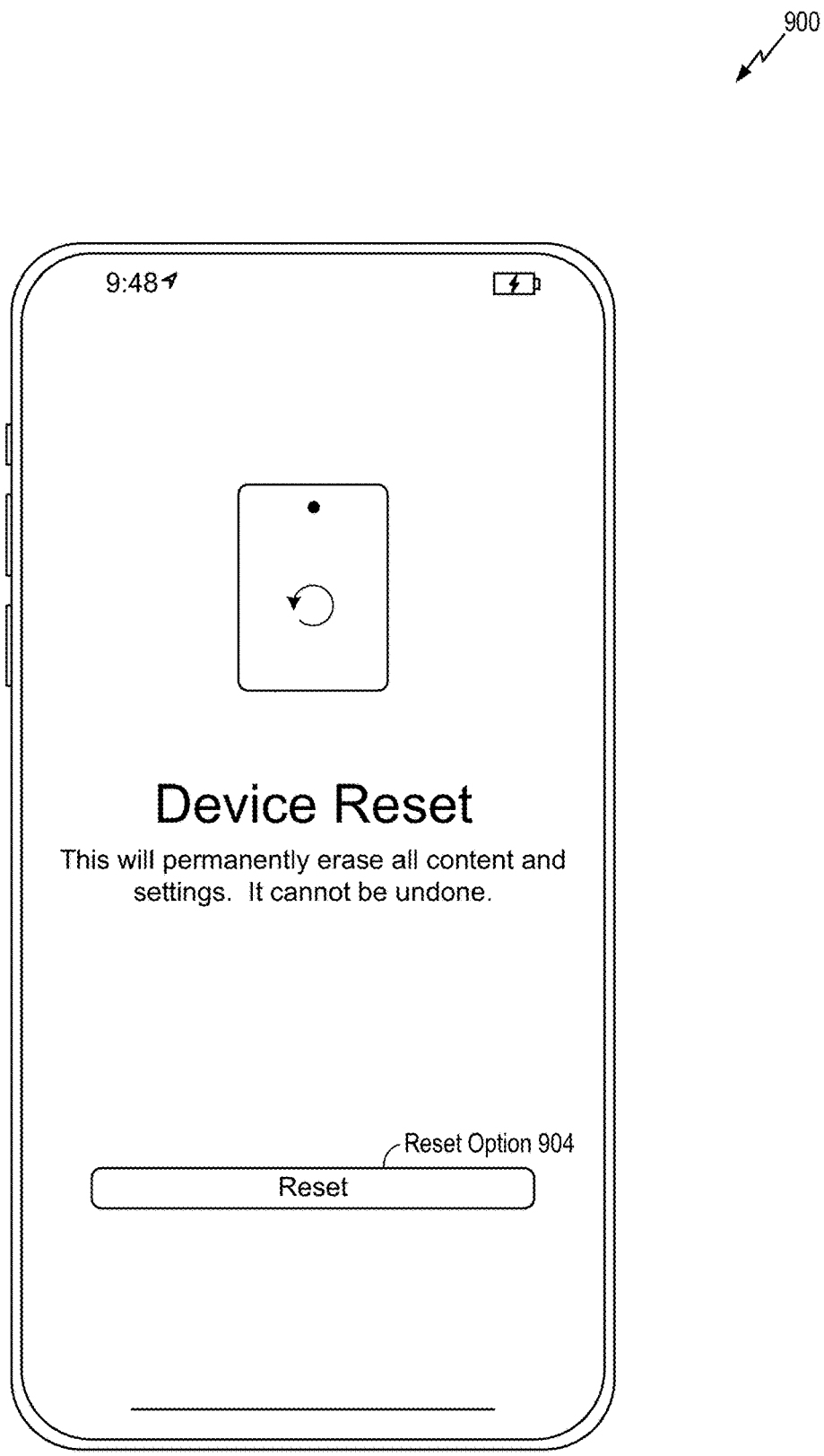
FIG. 9 is a diagram of a particular illustrative aspect of another GUI generated by the system of FIG. 1.
Figure 10:
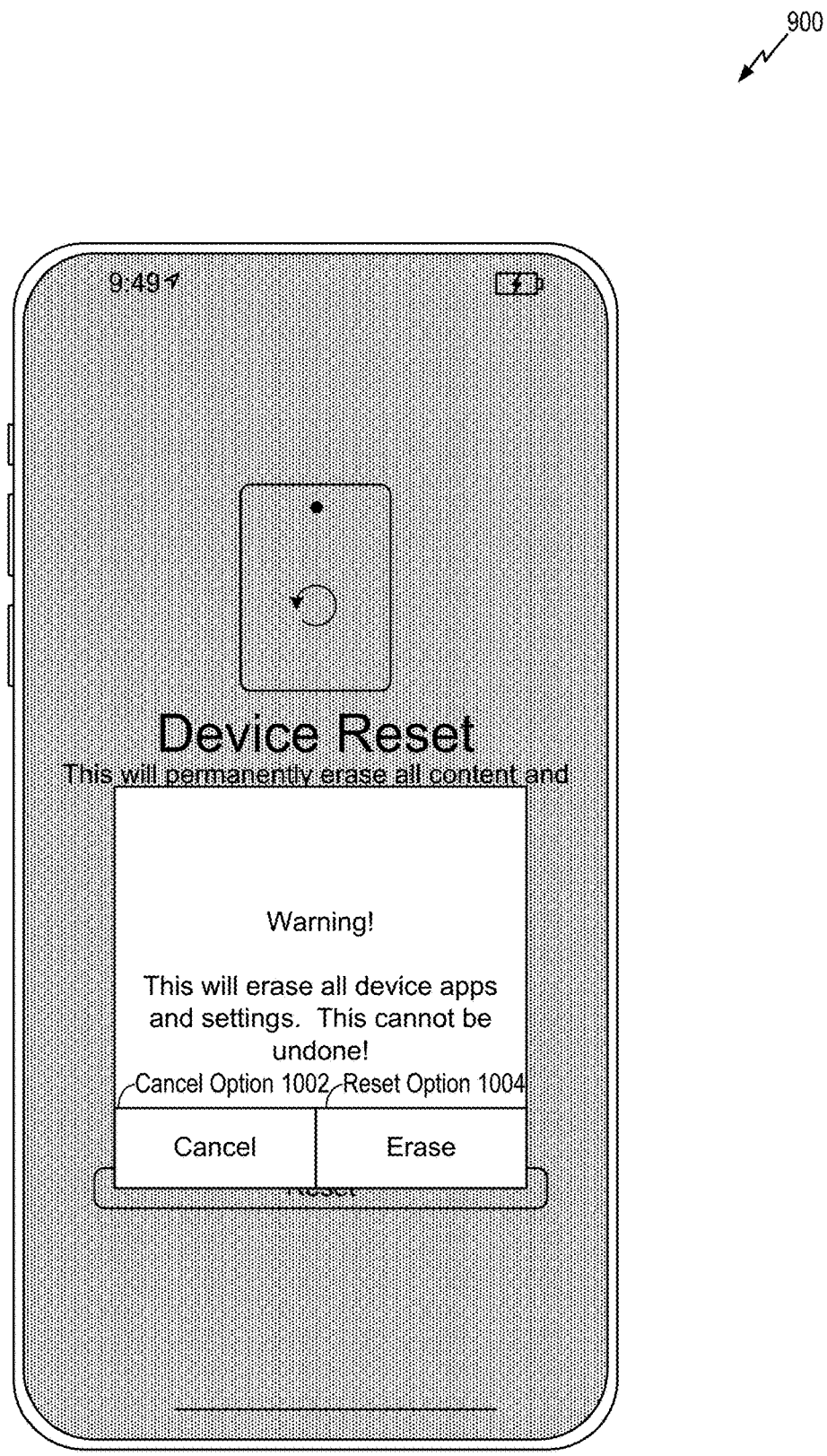
FIG. 10 is a diagram of a particular illustrative aspect of another GUI generated by the system of FIG. 1.

FIGS. 2-10 illustrate examples of GUIs generated by the system 100 of FIG. 1. FIG. 2 illustrates an example of a GUI corresponding to a selection of a setup option. FIGS. 3-5 illustrate examples of GUIs corresponding to a selection of a first group option for a first group. FIGS. 6-8 illustrate examples of GUIs corresponding to a selection of a second group option for a second group. FIGS. 9-10 illustrate examples of GUIs corresponding to a selection of a reset option.

Referring to FIG. 2, a GUI is shown and generally designated 200. In a particular aspect, the GUI 200 is generated by the device management client 152, the mobile device 150, the mobile device manager 134, the MDM server 120, the system 100 of FIG. 1, or a combination thereof.

The GUI 200 includes a group option 202 corresponding to the group 114 of FIG. 1, a group option 204 corresponding to a second group, a group option 206 corresponding to a third group, one or more additional group options corresponding to one or more additional groups, a submit option 208, or a combination thereof. In a particular aspect, the device management client 152 of FIG. 1 generates the GUI 200 in response to receiving the user input 104 indicating a selection of a setup option. For example, the device management client 152, in response to receiving the user input 104 indicating the selection of the setup option, sends the update request 161 to the MDM server 120, as described with reference to FIG. 1. The mobile device manager 134 of FIG. 1, in response to receiving the update request 161 from the mobile device 150, sends the group list 163 to the mobile device 150, as described with reference to FIG. 1.

In some implementations, the mobile device manager 134 sends the group list 163 to the mobile device 150 independently of the update request 161.

The device management client 152 of the mobile device 150 generates the GUI 200 based on the group list 163. For example, the device management client 152 generates the GUI 200 including a group option for each group indicated by the group list 163. To illustrate, the group list 163 indicates the group 114, the second group, the third group, one or more additional groups, or a combination thereof. The device management client 152 generates the GUI 200 including the group option 202 corresponding to the group 114 (e.g., "Nursing"), the group option 204 corresponding to the second group (e.g., "Technician"), the group option 206 corresponding to the third group (e.g., "Pharmacist"), the one or more additional group options corresponding to the one or more additional groups, or a combination thereof. In a particular aspect, the GUI 200 also includes the submit option 208. The device management client 152 provides the GUI 200 to a display of the mobile device 150.

The device management client 152, in response to receiving the user input 104 of FIG. 1 indicating that the group option 202 is selected, updates the GUI 200 to indicate that the group option 202 is selected, as illustrated in FIG. 3. In a particular aspect, the user 103 selects the submit option 208.

Referring to FIG. 4, a GUI is shown and generally designated 400. In a particular aspect, the GUI 400 is generated by the device management client 152, the mobile device 150, the mobile device manager 134, the MDM server 120, the system 100 of FIG. 1, or a combination thereof. For example, the device management client 152 of the mobile device 150 generates the GUI 400 in response to receiving the user input 104 indicating the selection of the group option 202, the submit option 208, or both.

In a particular aspect, the device management client 152 of the mobile device 150, in response to receiving the user input 104 indicating the selection of the group option 202, the submit option 208, or both, sends the join group request 155 to the MDM server 120 of FIG. 1. The join group request 155 indicates the group 114 corresponding to the group option 202. The MDM server 120, in response to receiving the join group request 155, sends a command to the mobile device 150 indicating that the action 157 is to be performed, as described with reference to FIG. 1.

The device management client 152 of the mobile device 150 generates the GUI 400 subsequent to performing at least a portion of the action 157. For example, the device management client 152 downloads the applications 167 associated with the group 114, downloads the configuration settings 165, or a combination thereof. The device management client 152 of the mobile device 150 generates the GUI 400 to indicate that the setup for the group 114 has been performed successfully. In a particular aspect, the GUI 400 includes an identifier 402 (e.g., group name) of the group 114 to indicate that the setup for the group 114 (e.g., "Nursing") is successful. In a particular aspect, the GUI 400 includes a particular message (e.g., a success message) indicated by the configuration settings 165. In a particular aspect, the device management client 152 of the mobile device 150 is configured to generate an error GUI (not shown) in response to detecting an error during setup (or reset) of the mobile device 150. In a particular aspect, the error GUI includes a particular message (e.g., an error message) indicated by the configuration settings 165. For example, the particular message includes a particular status code.

Referring to FIG. 5, a GUI is shown and generally designated 500. In a particular aspect, the GUI 500 is generated by the device management client 152, the mobile device 150, the mobile device manager 134, the MDM server 120, the system 100 of FIG. 1, or a combination thereof. For example, the device management client 152 of the mobile device 150 generates the GUI 500 in response to receiving the user input 104 indicating the selection of the group option 202, the submit option 208, or both. In a particular aspect, the device management client 152 of the mobile device 150 provides the GUI 500 to a display of the mobile device 150 for display subsequent to the GUI 400 of FIG. 4.

The device management client 152 generates the GUI 400 including icons of the applications 167 corresponding to the group 114. For examples, the applications 167 include a first application, a second application, a third application, a fourth application, or a combination thereof. The GUI 400 includes an icon 510, an icon 512, an icon 514, and an icon 516 for the first application, the second application, the third application, and the fourth application, respectfully. It should be understood that the applications 167 including four applications is provided as an illustrative example. In some implementations, the applications 167 include fewer than four applications or more than four applications.

In a particular aspect, the applications 153 that are not associated with the group 114 are also available (e.g., installed) at the mobile device 150. For example, the applications 153 are associated with one or more groups other than the group 114. The GUI 500 excludes icons of the applications 153. For example, the device management client 152 hides the icons of the applications 153 on the GUI 500.

In a particular aspect, the device management client 152 generates the GUI 500 to have a particular layout, a particular background image, particular icons, a particular formatting, particular colors, particular text, a particular header image, particular title text, particular body text, particular button text, particular button color, a particular arrangement, or a combination thereof, based on the configuration settings 165. The GUI 500 is thus automatically generated to enable access to the applications 167 based on the configuration settings 165 for the group 114 (e.g., "Nursing"). The GUI 500 includes a setup option 502, a reset option 504, or both. In a particular aspect, the setup option 502, the reset option 504, or both correspond to application icons. For example, the applications 167 include a setup application, a reset application, or both. The icons of the applications 167 include the setup option 502, the reset option 504, or both. The device management client 152 provides the GUI 500 to a display of the mobile device 150.

In a particular aspect, the device management client 152 of the mobile device 150 receives the user input 104 of FIG. 1 indicating a selection of the setup option 502, as further described with reference to FIG. 6. In a particular aspect, the device management client 152 of the mobile device 150 receives the user input 104 of FIG. 1 indicating a selection of the reset option 504, as further described with reference to FIG. 9.

Referring to FIG. 6, a GUI is shown and generally designated 600. In a particular aspect, the GUI 600 is generated by the device management client 152, the mobile device 150, the mobile device manager 134, the MDM server 120, the system 100 of FIG. 1, or a combination thereof.

The GUI 600 includes the group option 202 corresponding to the group 114 of FIG. 1, the group option 204 corresponding to a second group, the group option 206 corresponding to a third group, one or more additional group options corresponding to one or more additional groups, the submit option 208, or a combination thereof.

In a particular aspect, the device management client 152 of FIG. 1 generates the GUI 600 in response to receiving the user input 104 indicating a selection of the setup option 502 of FIG. 5. For example, the device management client 152, in response to receiving the user input 104 indicating the selection of the setup option 502, sends the update request 161 to the MDM server 120, as described with reference to FIG. 1. The mobile device manager 134 of FIG. 1, in response to receiving the update request 161 from the mobile device 150, sends the group list 163 to the mobile device 150, as described with reference to FIG. 1.

The device management client 152 of the mobile device 150 generates the GUI 600 based on the group list 163. For example, the device management client 152 generates the GUI 600 including a group option for each group indicated by the group list 163. To illustrate, the group list 163 indicates the group 114, the second group, the third group, one or more additional groups, or a combination thereof. The device management client 152 generates the GUI 600 including the group option 202 corresponding to the group 114 (e.g., "Nursing"), the group option 204 corresponding to the second group (e.g., "Technician"), the group option 206 corresponding to the third group (e.g., "Pharmacist"), the one or more additional group options corresponding to the one or more additional groups, or a combination thereof.

In FIG. 6, the GUI 600 includes the same group options as the GUI 200 of FIG. 2. In some aspects, the GUI 600 includes distinct group options compared to the GUI 200. For example, the GUI 200 is based on a first version of the group list 163 that indicates a first set of groups, and the GUI 600 is based on an updated version of the group list 163 that indicates a second set of groups. In this example, the GUI 600 excludes one or more first group options that were included in the GUI 200, includes one or more second group options that were not included in the GUI 200, or a combination thereof. The first group options correspond to one or more first groups that were indicated in the first version of the group list 163 and are not indicated in the updated version of the group list 163. The second group options correspond to one or more second groups that were not indicated in the first version of the group list 163 and are indicated in the updated version of the group list 163.

In a particular aspect, the GUI 600 also includes the submit option 208. The device management client 152 provides the GUI 600 to a display of the mobile device 150. The device management client 152, in response to receiving the user input 104 of FIG. 1 indicating that the group option 204 is selected, updates the GUI 600 to indicate that the group option 204 is selected, as illustrated in FIG. 6. In a particular aspect, the user 103 selects the submit option 208 subsequent to selecting the group option 204.

Referring to FIG. 7, a GUI is shown and generally designated 700. In a particular aspect, the GUI 700 is generated by the device management client 152, the mobile device 150, the mobile device manager 134, the MDM server 120, the system 100 of FIG. 1, or a combination thereof. For example, the device management client 152 of the mobile device 150 generates the GUI 700 in response to receiving the user input 104 indicating the selection of the group option 204, the submit option 208, or both.

In a particular aspect, the device management client 152 of the mobile device 150, in response to receiving the user input 104 indicating the selection of the group option 204, the submit option 208, or both, sends the join group request 155 to the MDM server 120 of FIG. 1. The join group request 155 indicates a second group (e.g., the group 114) corresponding to the group option 204. The MDM server 120, in response to receiving the join group request 155, sends a command to the mobile device 150 indicating that an action (e.g., the action 157) corresponding to the second group is to be performed, as described with reference to FIG. 1.

The device management client 152 of the mobile device 150 generates the GUI 700 subsequent to performing at least a portion of the action (e.g., the action 157) corresponding to the second group (e.g., the group 114), as described with reference to FIGS. 1 and 4. In a particular aspect, the GUI 700 includes an identifier 702 (e.g., group name) of the second group (e.g., the group 114) to indicate that the setup for the group 114 (e.g., "Technician") is successful.

Referring to FIG. 8, a GUI is shown and generally designated 800. In a particular aspect, the GUI 800 is generated by the device management client 152, the mobile device 150, the mobile device manager 134, the MDM server 120, the system 100 of FIG. 1, or a combination thereof. For example, the device management client 152 of the mobile device 150 generates the GUI 800 in response to receiving the user input 104 indicating the selection of the group option 204, the submit option 208, or both. In a particular aspect, the device management client 152 of the mobile device 150 provides the GUI 800 to a display of the mobile device 150 for display subsequent to the GUI 700 of FIG. 7.

The device management client 152 generates the GUI 800 including icons of applications (e.g., the applications 167) corresponding to the second group (e.g., the group 114) associated with the group option 204. In a particular example, second applications corresponding to the second group associated with the group option 204 (e.g., "Technician") are distinct from first applications corresponding to the group 114 associated with the group option 202 (e.g., "Nursing"). For example, the first applications include a first application corresponding to the icon 510, a second application corresponding to the icon 512, a third application corresponding to the icon 514, and a fourth application corresponding to the icon 516, as described with reference to FIG. 5. The second applications include the first application, the second application, and a fifth application.

The device management client 152 of the mobile device 150 generates the GUI 800 including the icon 510 corresponding to the first application, the icon 512 corresponding to the second application, and an icon 814 corresponding to the fifth application. The GUI 800 does not display the icon 514 corresponding to the third application, the icon 516 corresponding to the fourth application, or both. In a particular aspect, the third application, the fourth application, or both, are available (e.g., installed) at the mobile device 150. In this aspect, the icon 514, the icon 516, or both are hidden on the GUI 800. In a particular implementation, the device management client 152 can switch between the setup for the group 114 (e.g., "Nursing") and the setup for the second group (e.g., "Technician") by restoring the icons and settings for the selected group. In this implementation, the applications and associated data are not deleted when the user 103 switches between groups.

In a particular aspect, the device management client 152 generates the GUI 800 to have a particular layout, a particular background image, particular icons, a particular formatting, particular colors, particular text, a particular arrangement, or a combination thereof, based on the configuration settings 165. The GUI 800 is thus automatically generated to enable access to the applications based on the configuration settings 165 for the second group (e.g., "Technician"). The GUI 800 includes the setup option 502, the reset option 504, or both. The device management client 152 provides the GUI 800 to a display of the mobile device 150.

In a particular aspect, the device management client 152 of the mobile device 150 receives the user input 104 of FIG. 1 indicating a selection of the setup option 502, as described with reference to FIG. 6. In a particular aspect, the device management client 152 of the mobile device 150 receives the user input 104 of FIG. 1 indicating a selection of the reset option 504, as further described with reference to FIG. 9.

Referring to FIG. 9, a GUI is shown and generally designated 900. In a particular aspect, the GUI 900 is generated by the device management client 152, the mobile device 150, the mobile device manager 134, the MDM server 120, the system 100 of FIG. 1, or a combination thereof.

For example, the device management client 152 of the mobile device 150 generates the GUI 900 in response to receiving the user input 104 indicating the selection of the reset option 504 of FIG. 5. In a particular aspect, the GUI 900 includes a message indicating that device reset is irreversible. The GUI 900 includes a reset option 904. In a particular aspect, the device management client 152 of the mobile device 150 provides the GUI 900 to a display of the mobile device 150.

The device management client 152 of the mobile device 150, in response to receiving the user input 104 indicating a selection of the reset option 904 of FIG. 9, updates the GUI 900 to display a second message indicating that device reset is irreversible, as illustrated in FIG. 10. The GUI 900 includes a cancel option 1002, a reset option 1004, or both.

The device management client 152, in response to receiving the user input 104 indicating a selection of the cancel option 1002, provides the GUI 800 to a display of the mobile device 150. Alternatively, the device management client 152, in response to receiving the user input 104 indicating a selection of the reset option 1004, sends the reset request 185 of FIG. 1 to the MDM server 120, as described with reference to FIG. 1.

The system 100 thus enables a user-initiated setup and reset at the mobile device 150. The setup and reset are automatically performed independently of an IT administrator. The system 100 enables the user 103 to switch between setups for various groups, reset the mobile device 150, or both.

Figure 11:
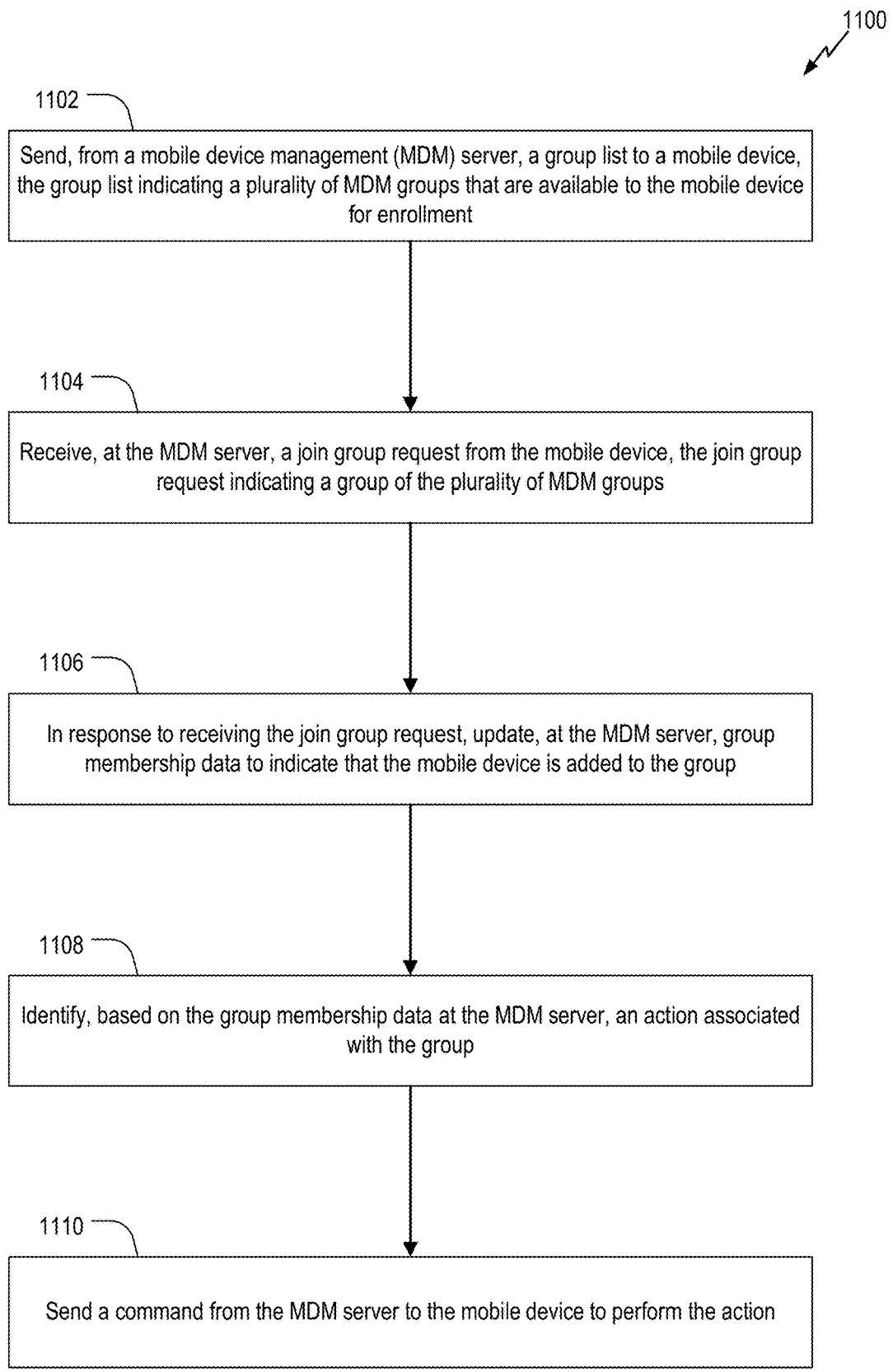
FIG. 11 is a flow chart of a method of group-based mobile device management.

Referring to FIG. 11, a method of group-based mobile device management is shown and generally designated 1100. In a particular aspect, the method 1100 is performed by the mobile device manager 134, the MDM server 120, the system 100 of FIG. 1, or a combination thereof.

The method 1100 includes sending, from a mobile device management (MDM) server, a group list to a mobile device, at 1102. For example, the MDM server 120 of FIG. 1 sends the group list 163 to the mobile device 150, as described with reference to FIG. 1. The group list 163 indicates a plurality of MDM groups that are available to the mobile device 150 for enrollment, as described with reference to FIG. 1.

The method 1100 also includes receiving, at the MDM server, a join group request from a mobile device, at 1104. For example, the MDM server 120 of FIG. 1 receives the join group request 155 from the mobile device 150, as described with respect to FIG. 1. The join group request 155 indicates the group 114 of the plurality of MDM groups.

The method 1100 also includes, in response to receiving the join group request, updating, at the MDM server, group membership data to indicate that the mobile device is added to the group, at 1106. For example, the mobile device manager 134 of FIG. 1, in response to receiving the join group request 155, updates the group membership data 128 to indicate that the mobile device 150 is added to the group 114, as described with respect to FIG. 1.

The method 1100 further includes identifying, based on the group membership data at the MDM server, an action associated with the group, at 1108. For example, the mobile device manager 134 of FIG. 1, identifies, based on the group membership data 128, the action 157 associated with the group 114, as described with respect to FIG. 1.

The method 1100 also includes sending a command from the MDM server to the mobile device to perform the action, at 1110. For example, the mobile device manager 134 of FIG. 1 sends a command to the mobile device 150 to perform the action 157, as described with respect to FIG. 1.

The method 1100 thus enables the MDM server 120 to automatically initiate performance of the action 157 in response to receiving the join group request 155. The mobile device 150 may, in response to receiving the command, perform the action 157 by downloading the applications 167, downloading and implementing the configuration settings 165, displaying icons corresponding to the applications 167, refraining from displaying icons corresponding to the applications 153, deleting (or uninstalling) the applications 153, or a combination thereof. The MDM server 120 thus enables a user-initiated setup of the mobile device 150 for a selected group. The user-initiated setup is independent of an IT administrator.

Figure 12:
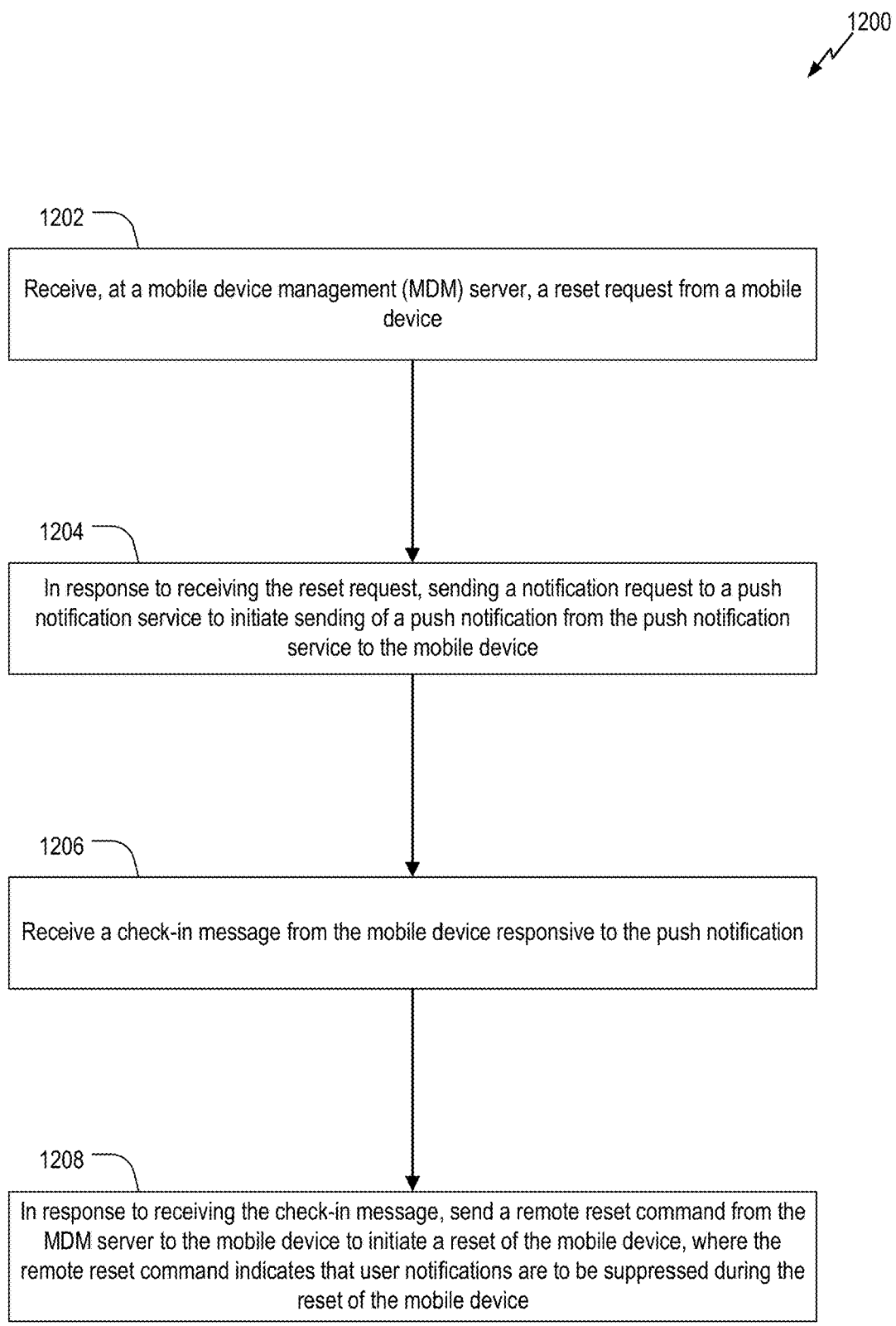
FIG. 12 is a flow chart of another method of group-based mobile device management.

Referring to FIG. 12, a method of group-based mobile device management is shown and generally designated 1200. In a particular aspect, the method 1200 is performed by the device management client 152, the mobile device 150, the system 100 of FIG. 1, or a combination thereof.

The method 1200 includes receiving, at a mobile device management (MDM) server, a reset request from a mobile device, at 1202. For example, the MDM server 120 of FIG. 1 receives the reset request 185 from the mobile device 150, as described with reference to FIG. 1.

The method 1200 also includes, in response to receiving the reset request, sending a notification request to a push notification service to initiate sending of a push notification from the push notification service to the mobile device, at 1204. The mobile device manager 134 of FIG. 1, in response to receiving the reset request 185, sends the notification request 124 to the push notification service 130 to initiate sending of the push notification 133 from the push notification service 130 to the mobile device 150, as described with reference to FIG. 1. The method 1200 further includes receiving a check-in message from the mobile device responsive to the push notification, at 1206. For example, the mobile device manager 134 of FIG. 1 receives a check-in message from the mobile device 150 responsive to the push notification 133, as described with reference to FIG. 1.

The method 1200 also includes, in response to receiving the check-in message, sending a remote reset command from the MDM server to the mobile device to initiate a reset of the mobile device, at 1208. For example, the mobile device manager 134 of FIG. 1, in response to receiving the check-in message from the mobile device 150, sends the reset command 187 (e.g., a remote reset command) to the mobile device 150 to initiate a reset of the mobile device 150, as described with reference to FIG. 1. The remote reset command 187 indicates that user notifications are to be suppressed during the reset of the mobile device 150, as described with reference to FIG. 1.

The method 1200 thus enables the MDM server 120 to automatically initiate reset of the mobile device 150 in response to receiving the reset request 185. The mobile device 150 may, in response to receiving the reset command 187, delete the applications 167, the applications 153, the configuration settings 165, the data 154, or a combination thereof. The mobile device 150 disables user notifications during the reset of the mobile device 150, as described with reference to FIG. 1. In a particular aspect, the mobile device 150 removes an activation lock from the mobile device 150. The MDM server 120 thus reduces (e.g., eliminates) the likelihood of a subsequent user of the mobile device 150 accessing sensitive information associated with the user 103.

Although one or more of FIGS. 1-12 may illustrate systems, devices, and/or methods according to the teachings of the disclosure, the disclosure is not limited to these illustrated systems, devices, and/or methods. Aspects of the disclosure may be suitably employed in any device that includes integrated circuitry including memory, a processor, and on-chip circuitry.

One or more functions or components of any of FIGS. 1-12 as illustrated or described herein may be combined with one or more other portions of another of FIGS. 1-12. Accordingly, no single aspect described herein should be construed as limiting and aspects of the disclosure may be suitably combined without departing form the teachings of the disclosure.

Those of skill would further appreciate that the various illustrative logical blocks, configurations, modules, circuits, and algorithm steps described in connection with the aspects disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium (e.g., a computer-readable storage device) is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal. A storage device is not a signal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method comprising:
    sending, from a mobile device management (MDM) server, a group list to a mobile device, the group list indicating a plurality of MDM groups that are available to the mobile device for enrollment, each group of the plurality of MDM groups associated with different member criteria;
    receiving, at the MDM server, a join group request from the mobile device, the join group request indicating a particular group of the plurality of MDM groups, the particular group associated with particular member criteria;
    in response to receiving the join group request, updating, at the MDM server, group membership data to indicate that the mobile device is added to the particular group;
    identifying, based on the group membership data at the MDM server, an action to be performed by the mobile device, the action associated with the particular member criteria of the particular group;
    sending a command from the MDM server to the mobile device to perform the action;
    receiving a reset request from the mobile device at the MDM server;
    in response to receiving the reset request, sending a notification request to a push notification service to initiate sending of a push notification from the push notification service to the mobile device;
    receiving a check-in message from the mobile device responsive to the push notification; and
    in response to receiving the check-in message, sending a remote reset command to the mobile device to initiate a reset of the mobile device from the MDM server, wherein the remote reset command indicates that user notifications are to be suppressed during the reset of the mobile device.

2. The method of claim 1, further comprising identifying a first set of applications that the particular group is authorized to access, wherein the action includes downloading the first set of applications to the mobile device.

3. The method of claim 1, further comprising identifying a first set of configuration settings for the particular group, wherein the action includes downloading the first set of configuration settings to the mobile device.

4. The method of claim 1, further comprising identifying, based on the group membership data, that the particular group is authorized to access a first set of applications, wherein the action includes showing, at a display of the mobile device, a first set of icons of the first set of applications.

5. The method of claim 1, further comprising identifying, based on the group membership data, that the particular group is restricted from accessing a second set of applications, wherein the action includes hiding, at a display of the mobile device, a second set of icons of the second set of applications.

6. The method of claim 1, further comprising, in response to receiving the join group request from the mobile device:
    determining, based on the group membership data, that the particular group includes a second computing device; and
    sending a second command to the second computing device to perform a second action.

7. The method of claim 6, wherein the second action includes updating application data at the second computing device to indicate that the mobile device is added to the particular group.

8. The method of claim 6, further comprising:
    sending a second notification request from the MDM server to the push notification service to initiate sending of a second push notification to the second computing device; and
    receiving, at the MDM server, a second check-in request from the second computing device responsive to the second push notification, wherein the second command is sent from the MDM server to the second computing device in response to receiving the second check-in request.

9. A computer-readable storage device storing instructions that, when executed by a processor, cause the processor to perform operations comprising:
    sending, from a mobile device management (MDM) server, a group list to a mobile device, the group list indicating a plurality of MDM groups that are available to the mobile device for enrollment, each group of the plurality of MDM groups associated with different member criteria;
    receiving, at the MDM server, a join group request from the mobile device, the join group request indicating a particular group of the plurality of MDM groups, the particular group associated with particular member criteria;
    in response to receiving the join group request, updating, at the MDM server, group membership data to indicate that the mobile device is added to the particular group;
    identifying, based on the group membership data at the MDM server, an action to be performed by the mobile device, the action associated with the particular member criteria of the particular group;
sending a command from the MDM server to the mobile device to perform the action;
receiving a reset request from the mobile device at the MDM server;
in response to receiving the reset request, sending a notification request to a push notification service to initiate sending of a push notification from the push notification service to the mobile device;
receiving a check-in message from the mobile device responsive to the push notification; and
in response to receiving the check-in message, sending a remote reset command from the MDM server to the mobile device to initiate a reset of the mobile device from the MDM server, wherein the remote reset command indicates that user notifications are to be suppressed during the reset of the mobile device.

10. The computer-readable storage device of claim 9, wherein a first value of a suppress notification parameter of the remote reset command indicates that the user notifications are to be suppressed during the reset of the mobile device.

11. The computer-readable storage device of claim 9, wherein the remote reset command indicates that an activation lock is to be bypassed at the mobile device during the reset of the mobile device.

12. A computer system comprising:
a mobile device configured to:
receive a group list from a mobile device management (MDM) server, the group list indicating a plurality of MDM groups that are available to the mobile device for enrollment, each group of the plurality of MDM groups associated with different member criteria;
receive a first user input indicating a selection of a particular group of the plurality of MDM groups; and
send a join group request to a mobile device management (MDM) server indicating the particular group;
the MDM server configured to, in response to receiving the join group request from the mobile device:
update group membership data to indicate that the mobile device is added to the particular group;
identify, based on the group membership data, an action to be performed by the mobile device, the action associated with the particular member criteria of the group; and
send a command to the mobile device to perform the action; and the MDM server further configured to:
in response to receiving a reset request from the mobile device, send a notification request to a push notification service to initiate sending of a push notification from the push notification service to the mobile device; and
receive a check-in message from the mobile device responsive to the push notification; and
in response to receiving the check-in message, send a remote reset command to the mobile device to initiate a reset of the mobile device from the MDM server, wherein the remote reset command indicates that user notifications are to be suppressed during the reset of the mobile device.

13. The computer system of claim 12, further comprising a second computing device configured to:
receive a second push notification from the push notification service responsive to a second notification request, wherein the MDM server is configured to, in response to receiving the join group request from the mobile device, send the second notification request to the push notification service;
in response to receiving the second push notification, send a check-in request to the MDM server;
receive a second command to perform a second action; and
perform the second action.

14. The computer system of claim 13, wherein the second action includes updating application data to indicate that the particular group includes the mobile device.

15. The computer system of claim 12, wherein the MDM server is further configured to identify a set of applications that the group is authorized to access, wherein the action includes downloading the set of applications to the mobile device.

16. The computer system of claim 12, wherein the remote reset command includes a factory reset command.

17. The computer system of claim 12, wherein the mobile device is configured to, in response to determining that the remote reset command indicates that user notifications are to be suppressed during the reset of the mobile device, suppress user notifications during the reset of the mobile device.

18. The computer system of claim 12, wherein the mobile device is configured to, in response to determining that an activation bypass parameter of the remote reset command has a first value, remove an activation lock during reset of the mobile device.

* * * * *